US010871271B2

(12) United States Patent
Latsis et al.

(10) Patent No.: US 10,871,271 B2
(45) Date of Patent: Dec. 22, 2020

(54) DIVERGING TIR FACET LED OPTICS PRODUCING NARROW BEAMS WITH COLOR CONSISTENCY

(71) Applicant: Tempo Industries, LLC, Irvine, CA (US)

(72) Inventors: Chris Latsis, Rancho Mission Viejo, CA (US); Dennis Pearson, Foothill Ranch, CA (US); Michael D. Bremser, Seal Beach, CA (US); Thomas Lueken, Beaumont, CA (US)

(73) Assignee: Tempo Industries, LLC, Irvine, CA (US)

( * ) Notice: Subject to any disclaimer, the term of this patent is extended or adjusted under 35 U.S.C. 154(b) by 34 days.

(21) Appl. No.: 16/153,231

(22) Filed: Oct. 5, 2018

(65) Prior Publication Data

US 2020/0109835 A1    Apr. 9, 2020

(51) Int. Cl.
*F21V 13/04* (2006.01)
*F21V 7/00* (2006.01)
*F21V 5/04* (2006.01)
*F21Y 115/10* (2016.01)

(52) U.S. Cl.
CPC ............... *F21V 13/04* (2013.01); *F21V 5/04* (2013.01); *F21V 7/0091* (2013.01); *F21Y 2115/10* (2016.08)

(58) Field of Classification Search
CPC ............ F21V 5/04–048; F21V 7/0091; F21V 13/00–04
USPC .......... 362/308–309, 311.01–311.1, 326–329
See application file for complete search history.

(56) References Cited

U.S. PATENT DOCUMENTS

| 5,591,074 | A | 1/1997 | Musschoot |
|---|---|---|---|
| 6,724,543 | B1 | 4/2004 | Chinniah et al. |
| 8,430,536 | B1 | 4/2013 | Zhao |
| 8,523,387 | B2 | 9/2013 | Anderson et al. |
| D691,323 | S | 10/2013 | Tang et al. |
| 8,556,469 | B2 | 10/2013 | Pickard |
| 9,285,098 | B2 | 3/2016 | Mallory et al. |
| 9,347,642 | B2 | 5/2016 | Catalano |
| 9,374,854 | B2 * | 6/2016 | Quilici ................... H05B 37/02 |
| 9,377,179 | B2 | 6/2016 | Tukker et al. |
| 9,568,665 | B2 | 2/2017 | Petluri et al. |
| 9,595,645 | B2 | 3/2017 | Tong et al. |
| 9,651,216 | B2 | 5/2017 | Rodgers et al. |
| 9,689,554 | B1 | 6/2017 | Householder et al. |
| 9,869,450 | B2 | 1/2018 | Pickard et al. |
| 10,030,825 | B2 | 7/2018 | Lunz et al. |
| 2010/0238645 | A1 | 9/2010 | Bailey |

(Continued)

OTHER PUBLICATIONS

Cree XLamp XB-D and XT-E LED Optical Design Considerations, Copyright 2012-2016, 15 pages.

*Primary Examiner* — Jason M Han
(74) *Attorney, Agent, or Firm* — Lapple Ubell IP Law, LLP; Franklin D. Ubell

(57) ABSTRACT

An LED optic having a first lens positioned below an LED within a lower collecting lens at a top end of a TIR lens portion, the TIR lens portion having an array of flat diverging TIR facets, beneath which is located an array of parabolic beam reflecting TIR facets. A second lens is positioned beneath the first lens and the array of parabolic beam reflecting TIR facets and is surrounded by an angle-matched refracting lens formed at the lower end of the array of parabolic beam reflecting TIR facets.

34 Claims, 24 Drawing Sheets

(56) References Cited

U.S. PATENT DOCUMENTS

| | | | |
|---|---|---|---|
| 2010/0259153 A1* | 10/2010 | Futami | G02B 19/0028 |
| | | | 313/114 |
| 2013/0163258 A1 | 6/2013 | Tang | |
| 2014/0016326 A1 | 1/2014 | Dieker et al. | |
| 2014/0160575 A1 | 6/2014 | Hukkanen | |
| 2014/0168998 A1 | 6/2014 | Tang et al. | |
| 2014/0247604 A1 | 9/2014 | Tang et al. | |
| 2016/0195243 A1* | 7/2016 | Dross | F21V 7/0091 |
| | | | 362/297 |

* cited by examiner

DIVERGING TIR FACET LED OPTICS PRODUCING NARROW BEAMS WITH COLOR CONSISTENCY

BACKGROUND OF THE DISCLOSURE

Field of the Disclosure

The subject disclosure relates to lighting systems and in one example to LED lighting systems having an optic structure employing an array of diverging TIR facets acting in conjunction with an angle matched refractive output lens to shape and direct the light output of an LED device so as to mitigate color over angle effects.

Description of Related Art

LEDs (light emitting diodes) are now in widespread use in various lighting applications. In many applications, it is desirable to produce a light output from the LEDs which is of a uniform color. Achievement of uniform color is complicated by the so-called "color over angle effect." As a result of this effect, the color of the light emitted by an LED can be dependent on the angle which the exiting light rays make with the surface of the LED. Various undesirable non-uniformities such as yellow rings in the LED light output can result.

TIR (Total Internal Reflectance) optics have been employed in various applications in the past. Typically, a TIR optic is a solid block of transparent material of a refractive index which results in total internal reflection of light incident on its solid-air interface. TIR optics may be formed by injection or press molding processes using various optical materials such as, for example, optical grade Polymethylmethacrylate (PMMA), also known as acrylic glass.

SUMMARY

Various illustrative embodiments provide an LED optic which redirects light from an LED into a beam pattern wherein the light is mixed to mitigate or eliminate color over angle effects.

According to one aspect of the disclosure, an LED optic is provided comprising a plurality of groups of first facets arranged down a side of the optic and an angle matched refracting lens disposed beneath the plurality of groups of first facets and comprising a plurality of second facets. Each group of first facets is configured to diverge light incident thereupon and direct the diverged light onto a respective one of the second facets of the angle matched refracting lens.

According to another aspect, the LED optic described in the preceding paragraph may further comprise a plurality of parabolic facets located on the side of the optic and below the plurality of groups of first facets and configured to direct light onto one of the second facets of the angle matched refracting lens.

According to another aspect, an LED optic as described in either of the two preceding paragraphs further comprise a first lens and a second lens disposed beneath the first lens, the second lens being surrounded by the angle matched refracting lens, the first lens and second lens being configured to collimate diverging beams of light exiting from a surface of an LED and received by the first lens.

In any of the embodiments described in the preceding paragraph, the first lens may be positioned within an upper collecting optic, the upper collecting optic being configured to direct light from an LED onto the plurality of groups of first facets. In any one of these embodiments, a lower collecting lens may be positioned between the upper collecting optic and the first lens and configured to project light from the LED onto the angle matched refracting lens.

According to another aspect, in any of the embodiments described above, the second facets of the angle matched refracting lens may be configured to produce an output beam of a selected spread. For example, in one embodiment, one or more of the second facets may be configured to produce an output beam having a 10 degree spread.

Further, in any one of the illustrative embodiments described above, each end of each first facet may be defined by a discontinuity which is circular, centered about a central axis of the optic, extends 360 degrees around the optic and lies in a plane perpendicular to the central axis. In any one of these embodiments, each first facet may be frusto-conically shaped.

Further, in any one of the illustrative embodiments described above, each end of each parabolic facet may be defined by a discontinuity which is circular, centered about a central axis of the optic, extends 360 degrees around the optic and lies in a plane perpendicular to the central axis.

Additionally, in any one of the embodiments described above each facet of each of the plurality of groups of first facets may be flat. Furthermore, in any such embodiment, each first facet may be a TIR facet or a flat TIR facet.

According to another aspect of the disclosure, an LED optic comprises a first lens configured to be positioned below an LED, the first lens being positioned within a lower collecting lens and an upper collecting optic. The first lens, lower collecting lens and upper collecting optic are positioned at a top end of a TIR lens portion having a first section comprising an array of diverging TIR facets, beneath which is located a second section comprising an array of parabolic beam reflecting TIR facets. A second lens is positioned beneath the first lens and beneath the array of parabolic beam reflecting TIR facets. Finally, an angle-matched refracting lens is positioned at an end of the array of parabolic TIR facets so as to surround the second lens. In various embodiments, each of the diverging TIR facets is flat. An optical system may be provided wherein the LED optic is positioned below or adjacent to an LED. According to another aspect, such an LED optic may include any one or more of the additional features described in the paragraphs above.

According to another aspect of the disclosure, an LED optic is provided comprising a TIR lens having a section comprising a plurality of diverging TIR facets and an angle matched refracting lens located beneath the TIR lens, the angle matched refracting lens being configured to receive light from the section comprising a plurality of diverging TIR facets and to direct that light out of the LED optic. According to another aspect, such an LED optic may include any one or more of the additional features described in the paragraphs above.

According to another aspect of the disclosure, an LED optic is provided comprising a TIR lens portion comprising a plurality of diverging TIR facets, a first of the diverging TIR facets being configured to receive a first set of light rays from a center of an LED and direct those rays towards a refracting lens element located below the TIR lens portion, the refracting lens element being configured to direct light out of the LED optic. According to another aspect, such an LED optic may include any one or more of the additional features described in the paragraphs above.

Any of the above-described embodiments may employ a reflector, which may be conically shaped positioned about a perimeter of a front surface of the LED optic. Any of the above described embodiments may further include one or more external side baffles positioned to control lateral light emitted from the LED optic either alone or in combination with such a reflector.

DETAILED DESCRIPTION

Figure 1:
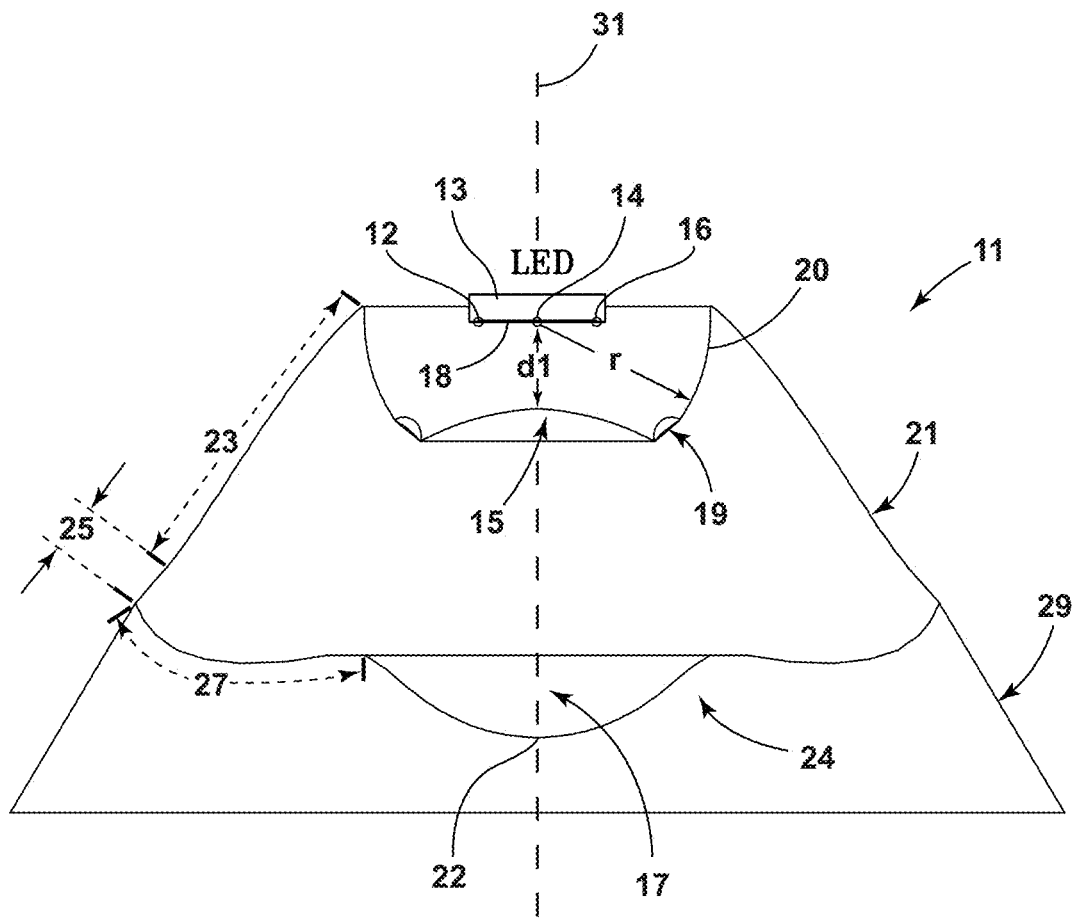
FIG. 1 is a side sectional view of an LED optic according to an illustrative embodiment.
Figure 2:
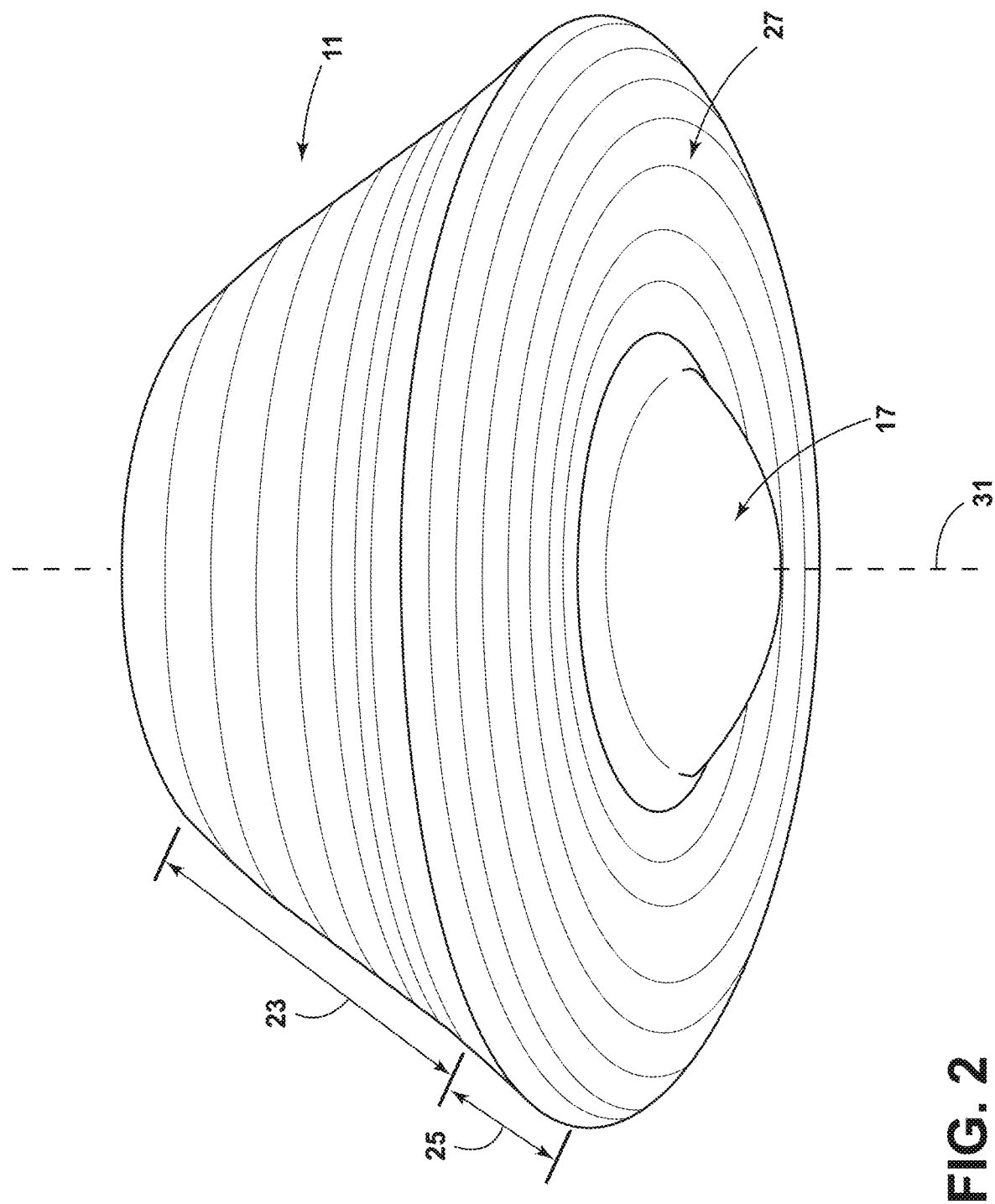
FIG. 2 is a bottom perspective view of the LED optic of FIG. 1.
Figure 3:
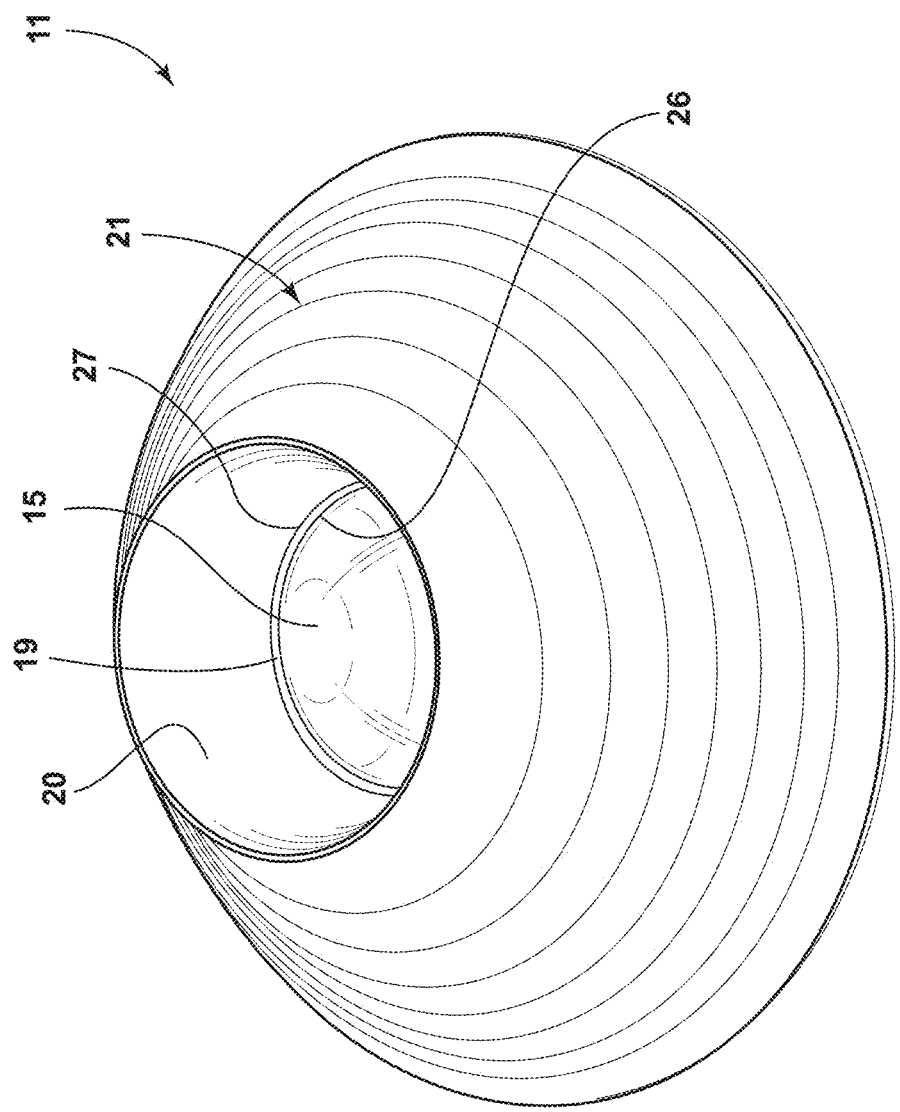
FIG. 3 is a top perspective view of the LED optic of FIG. 1.

An illustrative LED optic 11 is shown in FIGS. 1-3 and comprises a first lens 15, a second lens 17, an upper collecting optic 20, a lower collecting lens 19, a TIR ("Total Internal Reflectance") lens section 21, and an angle matched refracting lens 27. In an illustrative embodiment, the LED optic 11 is formed of a solid block of transparent material, for example, such as PMMA, for example, by injection molding processes.

In FIG. 1, an LED 13 is located above the first lens 15. The first lens 15 is positioned axially above the second lens 17, which is located at the lower end of the LED optic 11. The first lens 15 is radially surrounded by the lower collecting lens 19 and the upper collecting optic 20. For purposes of the illustrative embodiment, the front face 18 of the LED 13 is divided into three main points of light 12, 14, 16.

In an illustrative embodiment, the surface of the upper collecting optic 20 is located at a radius "r" from the center point of light 14, and the first lens 15 is located a distance d1 from the front surface 18 of the LED 13. In an illustrative embodiment, the radius r and distance d1 may be 0.149 and 0.075 inches, but of course may have other dimensions in other embodiments.

Further according to FIG. 1, the lens portion 21 of the optic 11 includes a region 23 of flat TIR facets and a region 25 of parabolic TIR facets. In the illustrative embodiment, the upper collecting optic 20 directs light toward the lens portion 21 of the optic 11, as will be described in more detail below. The lower end or front surface of the optic 11 is closed by the angle matched refracting lens 27, which surrounds the second lens 17, as seen in FIG. 2.

The optical design of illustrative embodiments produces a "relatively symmetrical about an optic axis 31" optical beam and considers the LED source 13 as a flat panel divided into three main points of light 12, 14, 16, when viewed in cross-section. These points of light 14, 12, 16 are respectively identified as: 1) the light center, 2) left of light center, and 3) right of light center at the furthest edges of the illuminated LED area (mean and extremes). This "three points of light" model covers a majority of the reflector/refractor incident light considered for redirection into the desired fixture beam pattern. In some embodiments, simulated optical analysis computer ("CAD") software may be used to perform complete ray-tracing analysis over a multitude of LED area source points and to fine tune the optical concept of the theoretical three points of light model. In the ensuing description, CAD ray traces are employed to illustrate operation of the illustrative LED optic 11 of FIG. 1. Such ray traces typically illustrate example ray path directions in the illustrative optic 11.

Figure 5:
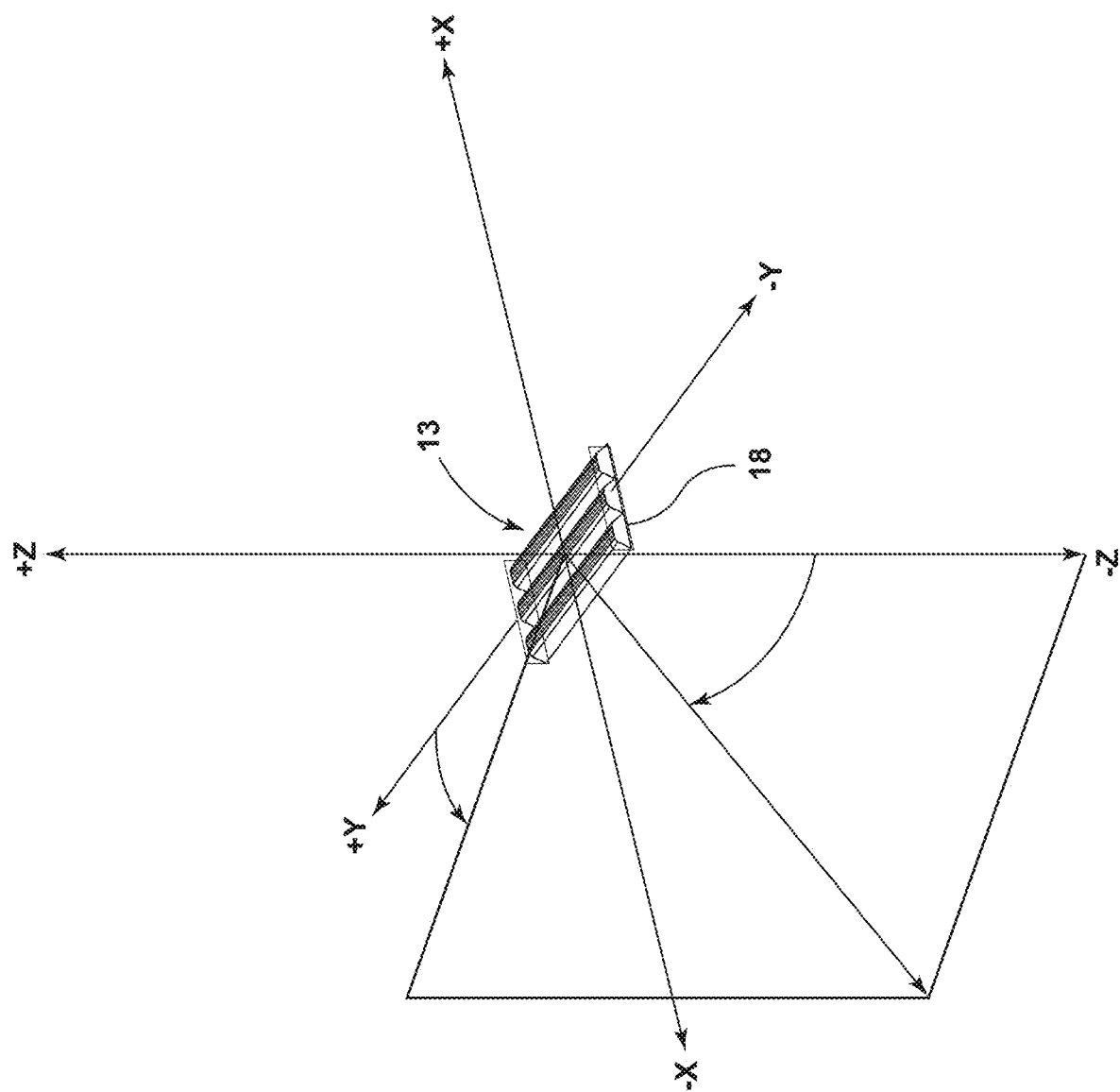
FIG. 5 shows a photometric axis coordinate system useful in describing the illustrative embodiments.

The "three points of light" model shown in FIG. 1 allows the construction of the optical controlling elements to be done within a two-dimensional plane, in cross-section, along a central axis of symmetry which is perpendicular to the largest face 18 of the light emitting diode 13. In lighting terms, as shown in FIG. 5, the direction of the one sided emitting plane 18 facing downward (floor or −Z) is called Nadir (0 degrees vertical). While the upward direction (ceiling or +Z) direction is called Zenith (180 degrees vertical). The angle which is contained within the light emitting face 18 of the LED is horizontal (90 degrees vertical from Nadir). The center of the optic system is where the LED emitting face 18 (90-degree horizontal axis) and the 0-180-degree vertical axes meet. This is considered 0, 0 (x, y coordinate system, or the Origin). In this description, the left half of the optics of an illustrative embodiment are described and developed. The developed cross-section contour is then "spun around" the 0-180-degree vertical axis (optic axis 31) to make a complete 3-D design.

Figure 6:
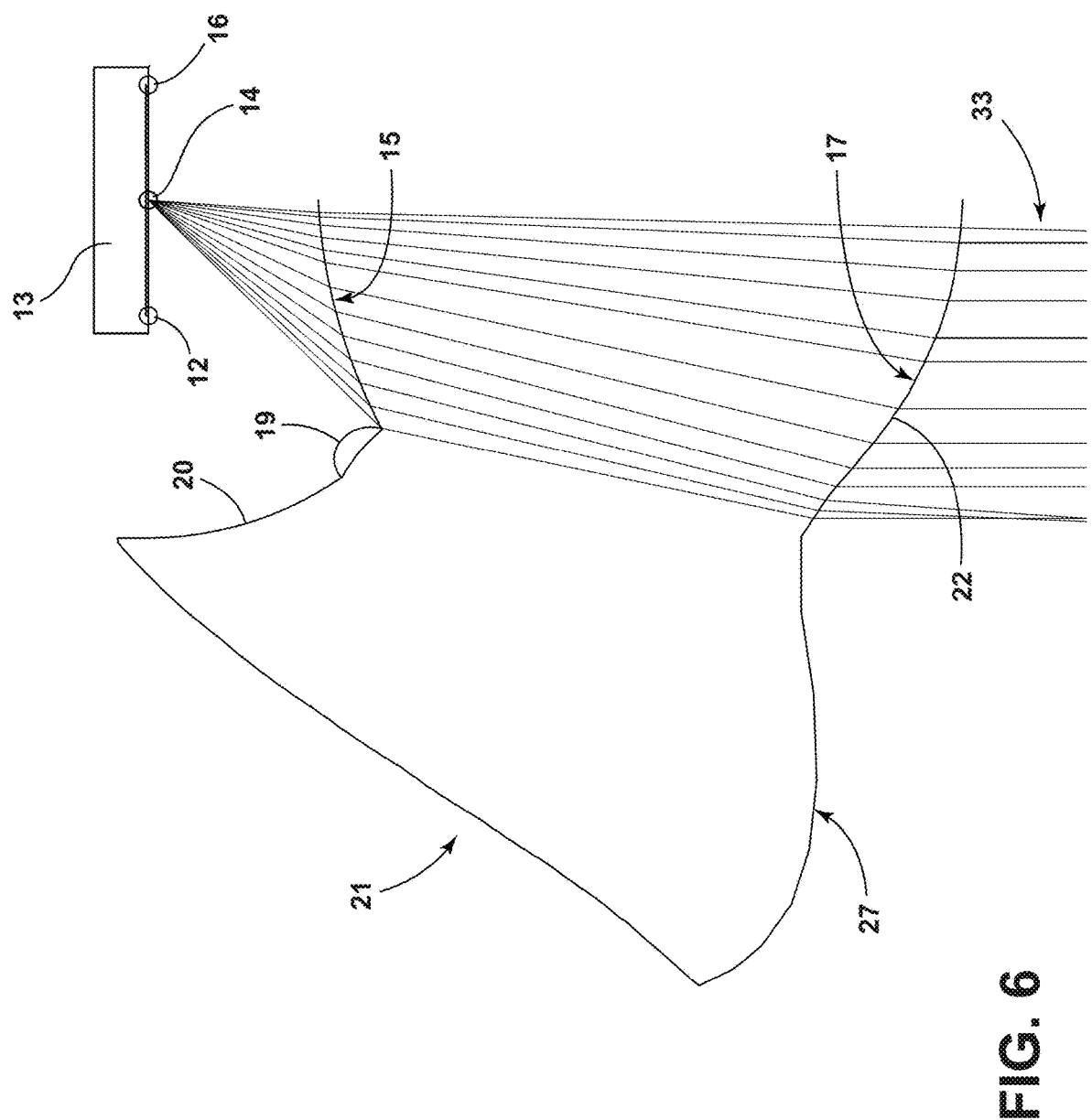
FIG. 6 is a CAD ray trace of rays emanating from a light center point of an LED and passing through a first and second lens according to an illustrative embodiment.
Figure 7:
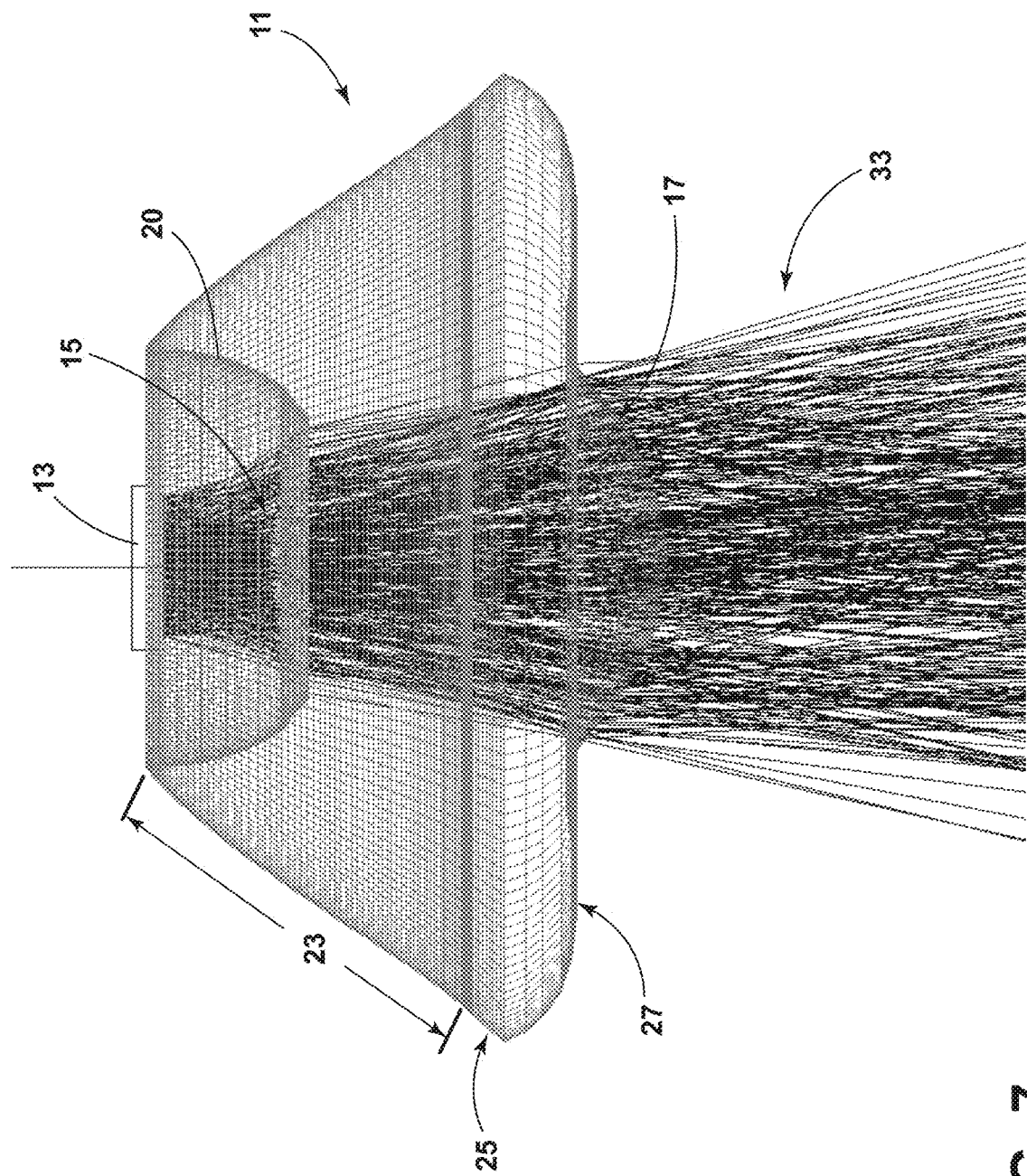
FIG. 7 is a computer ray trace simulation of operation of the first and second lens on the light output of an LED according to an illustrative embodiment.

As illustrated in FIG. 1, the central upper portion of the optic 11 is formed by using traditional lens image forming optics where the first lens 15, located directly in front of the LED's planar surface 18, is used to condense and redirect the wide diverging beam radiating from the center of the surface of the LED 13. The second lens 17 is aligned along the vertical axis 31 of the first lens 15 and is located on the front surface 24 of the optic 11. In an illustrative embodiment, each of the first and second lenses 15, 17 is a spherical convex lens. In operation, as shown in FIGS. 6 and 7, the second lens 17 takes the diverging beams of light from the first lens 15 and forms them into nearly parallel rays of light 33 exiting out the lens face 22 of the second lens 17. This portion of the optic 11 produces insignificant color mixing of the light from the LED 13 due to the parallel projected light rays 33. This is also the portion of the light from the LED 13 which exhibits minimal color-over-angle issues.

Figure 8:
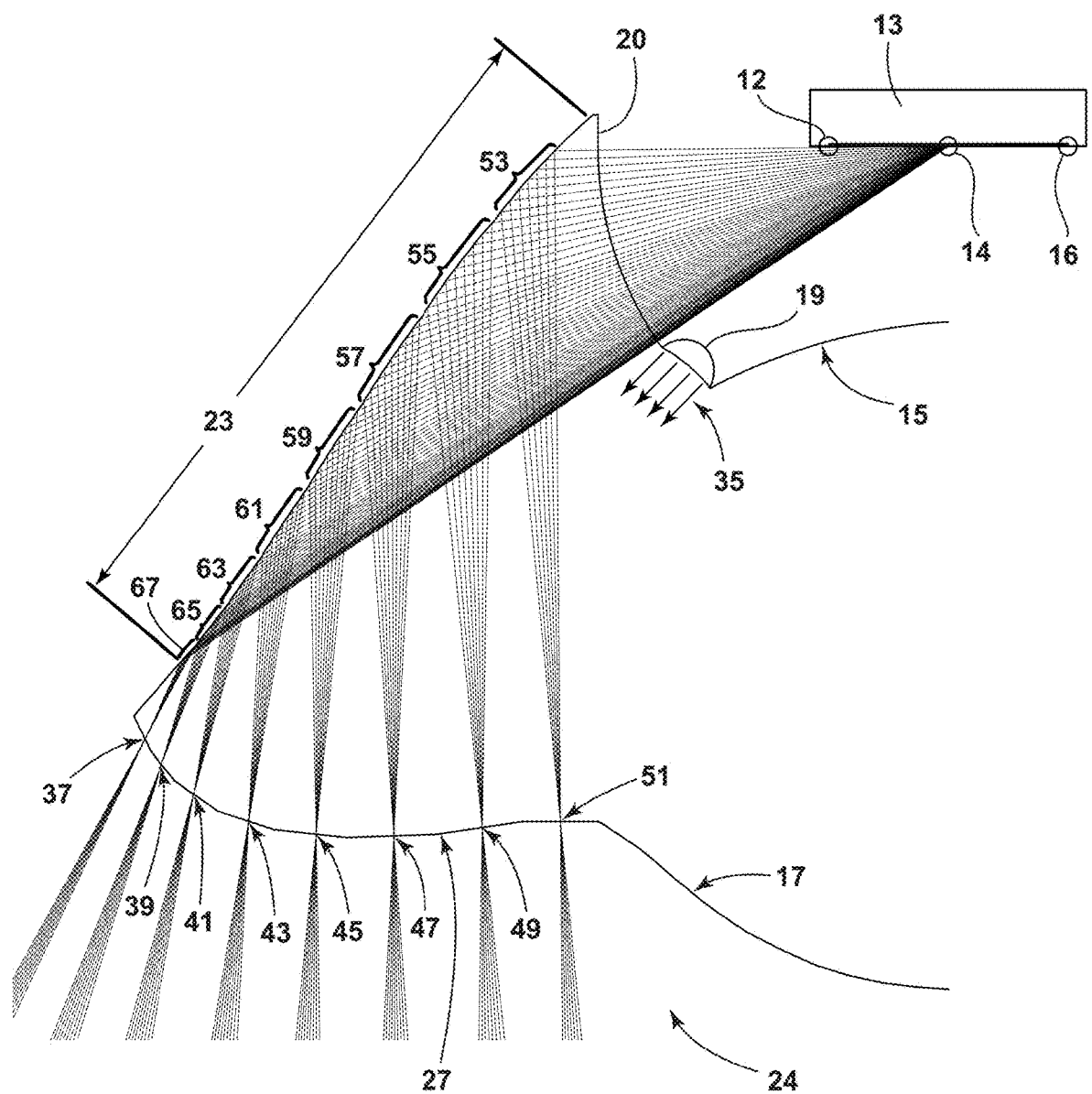
FIG. 8 is a CAD ray trace for TIR elements from an LED light center point with refracted exit rays not shown.

In an illustrative embodiment, as shown in FIG. 8, the main region 23 of TIR facets comprises a plurality of groups of facets 53, 55, 57, 59, 61, 63, 65, 67 arranged down the side of the optic 11, which are flat in profile and diverge the light from the LED 13 and place it onto corresponding central-interior facets 51,49, 47, 45, 43,41, 39, 37 of the angle matched refracting lens 27, which is located along the front or light emitting surface 24 of the optic 11. These central interior facets, e.g. 51, are referenced as the "angle-matched refracting exiting surface" of the lens 27. By using the diverging facets, e.g. 53, to direct the light collected from the LED 13 so as to aim it onto the specific angle-matched refracting exiting surface, e.g. 51, of the lens 27, the emanating light will be better color-mixed throughout the spread of the design beam.

In the illustrative embodiment shown in FIG. 8, the angular output of the collecting optic 20 employs the entirety of available flat facet groups, e.g. 53, and the lower collecting lens 19 distributes the remainder 35 of the rays from the center point 14. In the illustrative embodiment, the lower collecting lens 19 projects these rays as nearly parallel rays 35 onto certain designated facets of the angle matched refracting lens 27. In the illustrative embodiment, the edges 26, 27 (FIG. 3) of the lower collecting lens 19 are circular, centered about the axis 31, and lie in a plane perpendicular to that axis.

Figure 9:
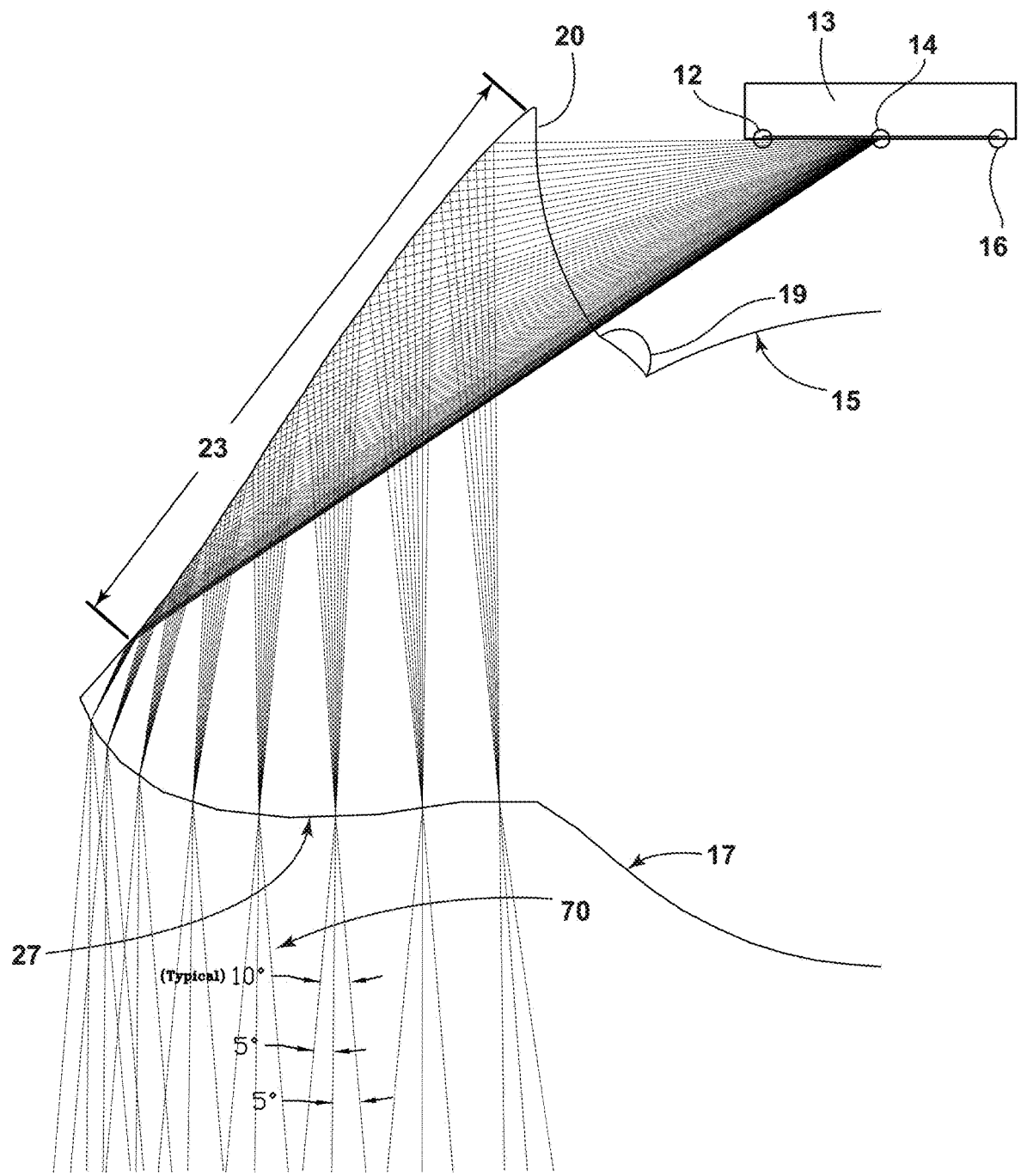
FIG. 9 is a CAD ray trace for TIR elements from an LED light center point with actual refracted exit rays shown.

As further shown in FIG. 8, each exiting surface element of the angle matched refracting lens 27 has a series of corresponding refractor facets 37, 39, 41, 43, 45, 47, 49, 51, that refract rays from the three LED light centers 12, 14, 16 to within the design beam spread. In one illustrative embodiment, the spread of the target beam, e.g. 70 (FIG. 9), is 10 degrees, but can vary in various embodiments, depending upon the desired overall output beam width. The ray trace of FIG. 9 shows how light from the center 14 of the LED 13 to each facet of each facet group, e.g. 53, is collected and placed onto the specific central-interior sections, e.g. 51, of the exit face lens 27 resulting in a target beam 10-degree total spread (+/−5 degrees from Nadir). In operation, the light is mixed within this 10-degree beam spread, thereby significantly reducing the color-over-angle issue in the overall output beam of light produced by the optic 11.

Figure 10:
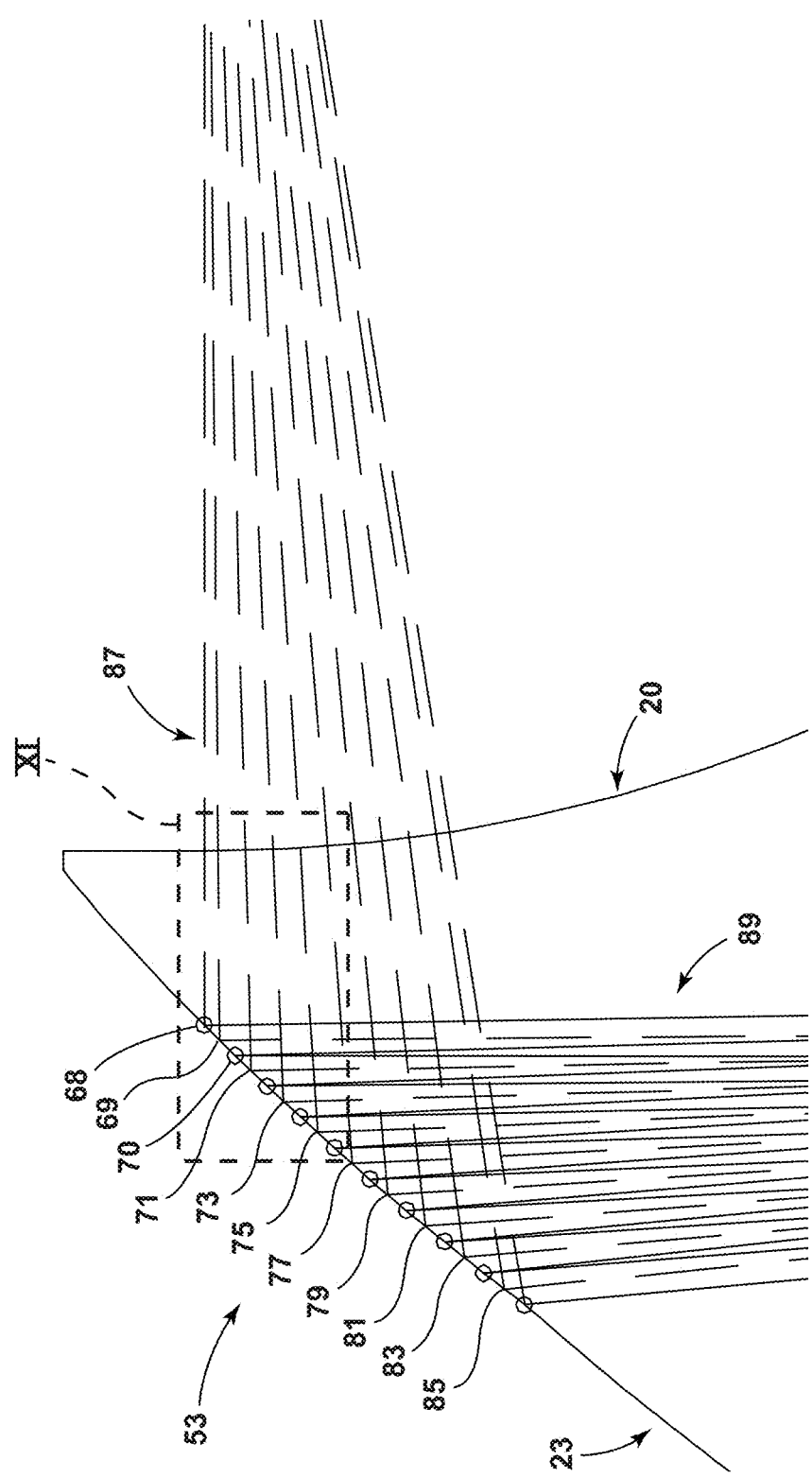
FIG. 10 is an enlarged view of a first portion of FIG. 8.
Figure 11:
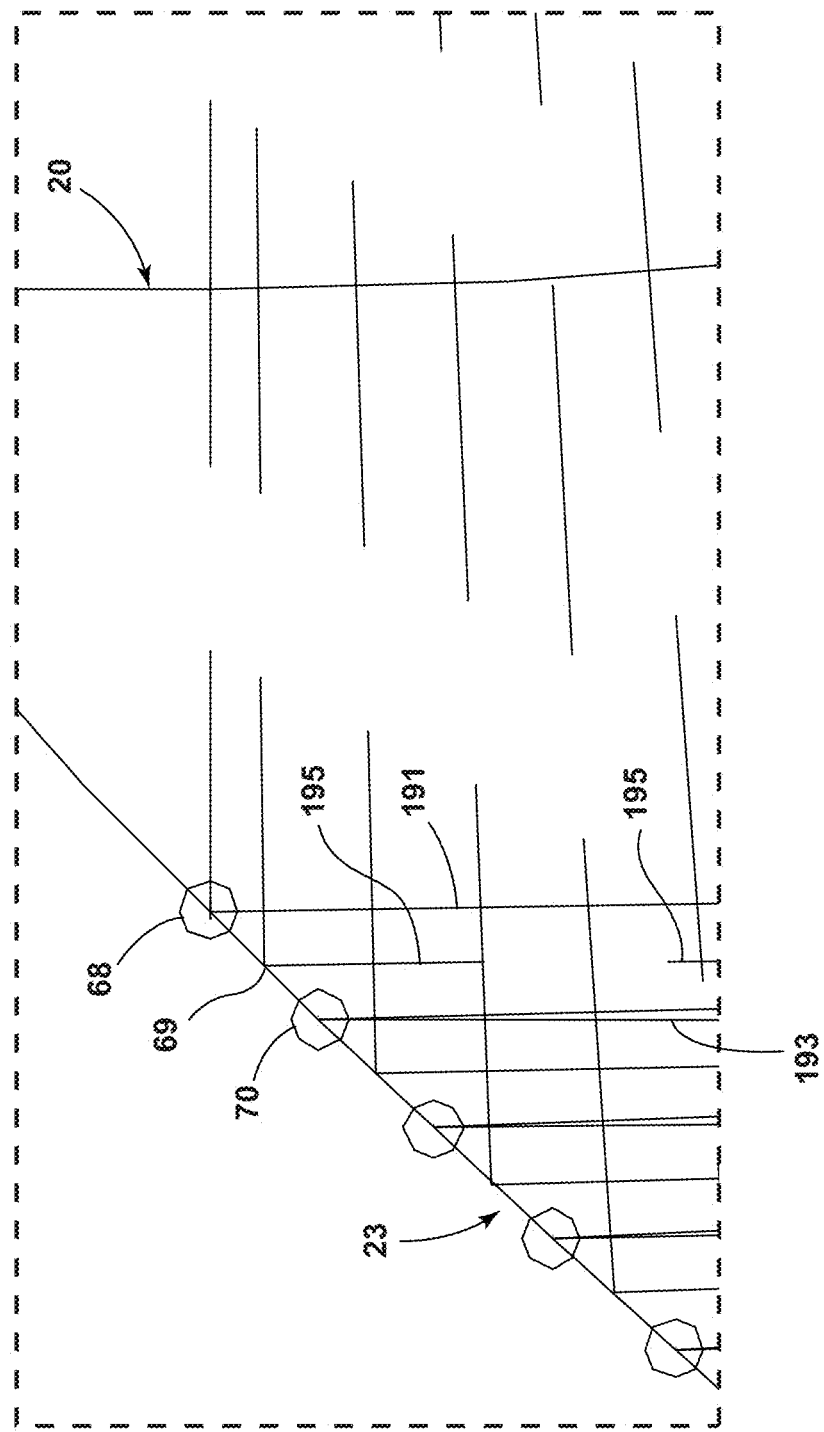
FIG. 11 is an enlarged view of a portion of FIG. 10.
Figure 12:
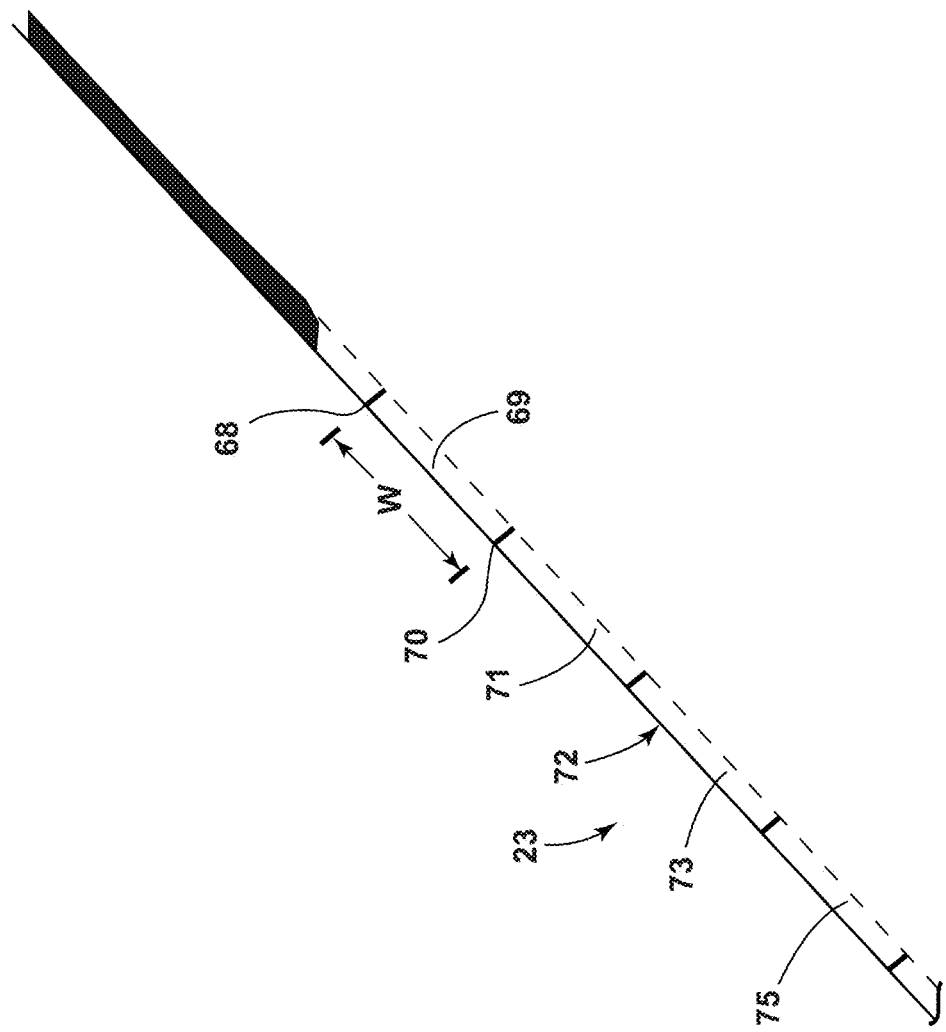
FIG. 12 is a side view illustrating a plurality of TIR facets according to an illustrative embodiment.

One embodiment of the diverging facet group 53 is illustrated in FIGS. 10-12. In these Figures, the dashed lines (e.g. 195 in FIG. 11) represent the rays of light traced from the center 14 of the LED 13 to the center of each of the nine facets 69, 71, 73, 75, 77, 79, 81, 83, 85 of the facet group 53. The solid lines (e.g. 191, 193 in FIG. 11) represent rays reflected from each end (e.g., 68, 70, FIG. 11) of the respective nine facets (3 rays total for each facet).

Each end of each flat facet, e.g. 69, is denoted by a small circle, e.g. 68, 70. Each such end is defined by a structural discontinuity which is circular and extends 360 degrees around the optic 11. Each such circular discontinuity is centered about the central axis 31 of the optic 11 and lies in a plane perpendicular to that axis 31. Hence, each facet 69, 71 etc. is frusto-conically shaped in the illustrative embodiment and has a width "W," (FIG. 12). In the illustrative embodiment, the width of the facets 69, 71, etc. narrows as one moves down the side of the lens as dictated by the ray trace design scheme implemented in the illustrative embodiment. An illustrative width "W" for the first facet 69 (FIG. 12) may be 0.004 inches. In an illustrative embodiment, the index of refraction of the TIR lens material may be 1.491 at the air/plastic boundary 72 (FIG. 12), but may vary in other embodiments.

Figure 13:
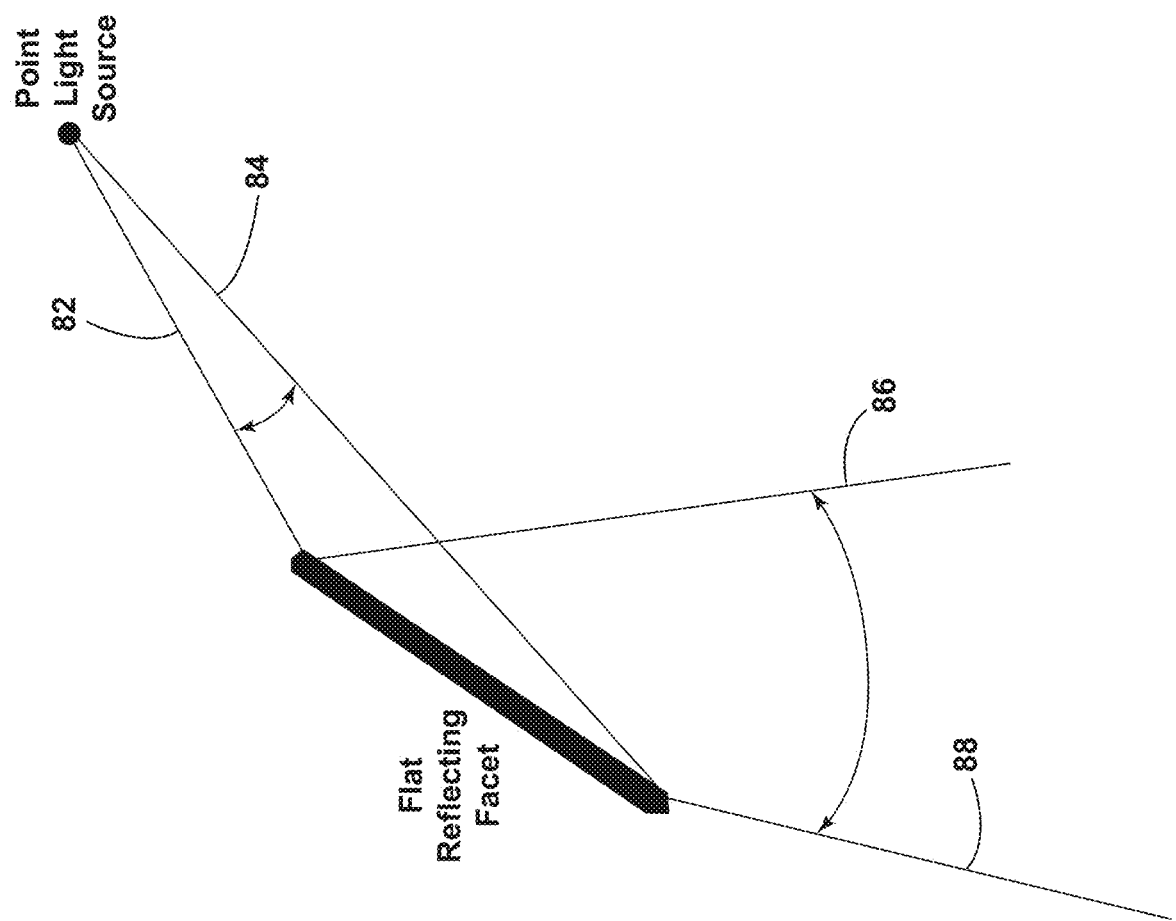
FIG. 13 is a schematic diagram illustrating how a facet diverges light according to an illustrative embodiment.

FIG. 13 illustrates how a flat TIR facet diverges the incident light. In particular, ray 82 incident at the upper end of the flat facet is reflected as ray 86, while ray 84 incident on the lower end of the facet is reflected as ray 88, which exits at a larger angle than ray 86 exits, thereby resulting in divergence of the incident light.

Figure 14:
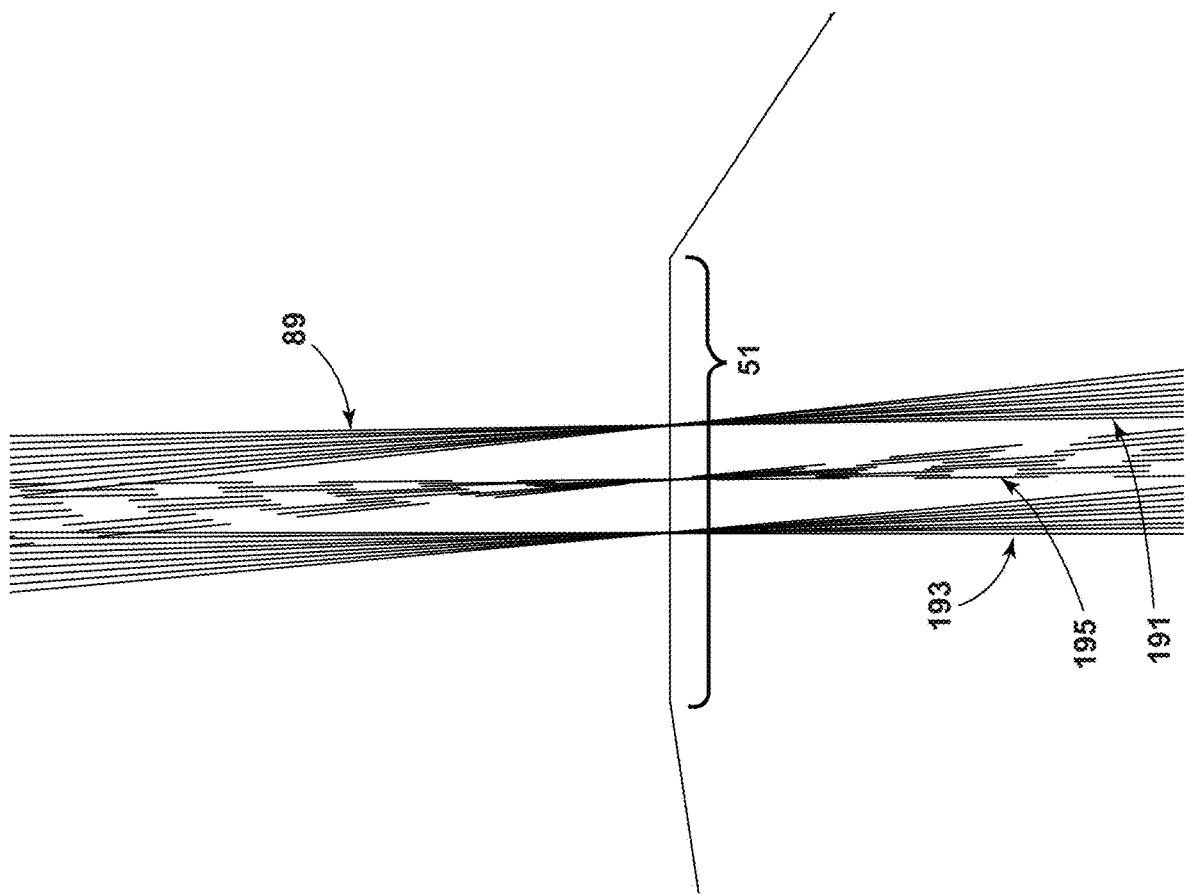
FIG. 14 is an enlarged view of a second portion of FIG. 8.

FIG. 14 shows the rays 89 from FIG. 10 impacting the central refractor facet 51 of the angle matched refracting lens 27. The optical properties of this facet 51 are selected to refract light into +/−5 degrees from Nadir. The actual true refracted rays exiting out from the facet 51 of the lens 27 are not shown in FIG. 14. In operation, although the rays from the center of each facet, e.g. 69, appear to converge to a point on the front exit face (air-lens boundary) 24 of the lens 27, the rays actually traced from the center point 14 of the LED 13 are spread right and left across the exit face, as illustrated in FIG. 14.

Figure 15:
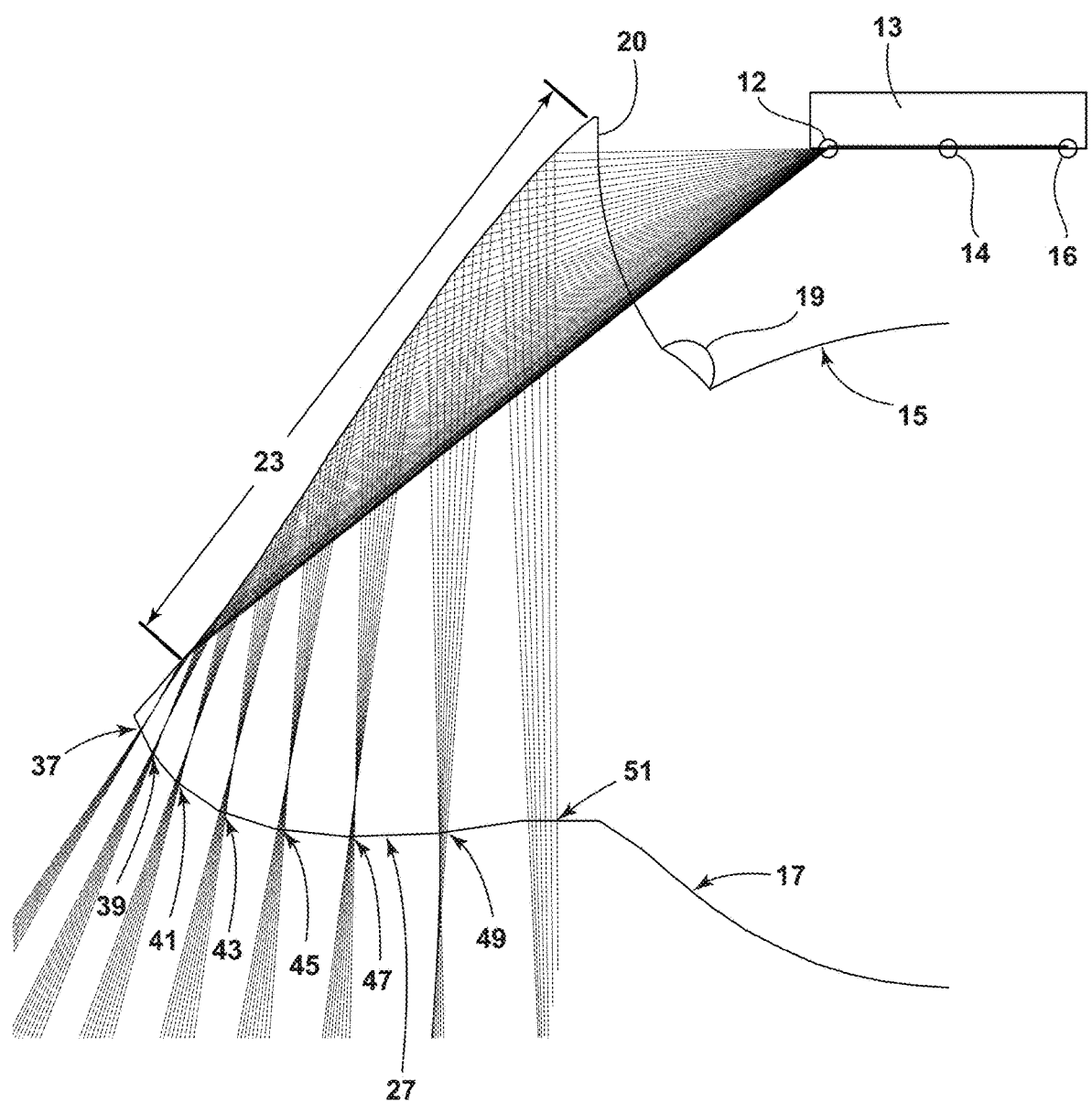
FIG. 15 is a CAD ray trace for TIR elements from an LED left light center point with refracted exit rays not shown.
Figure 16:
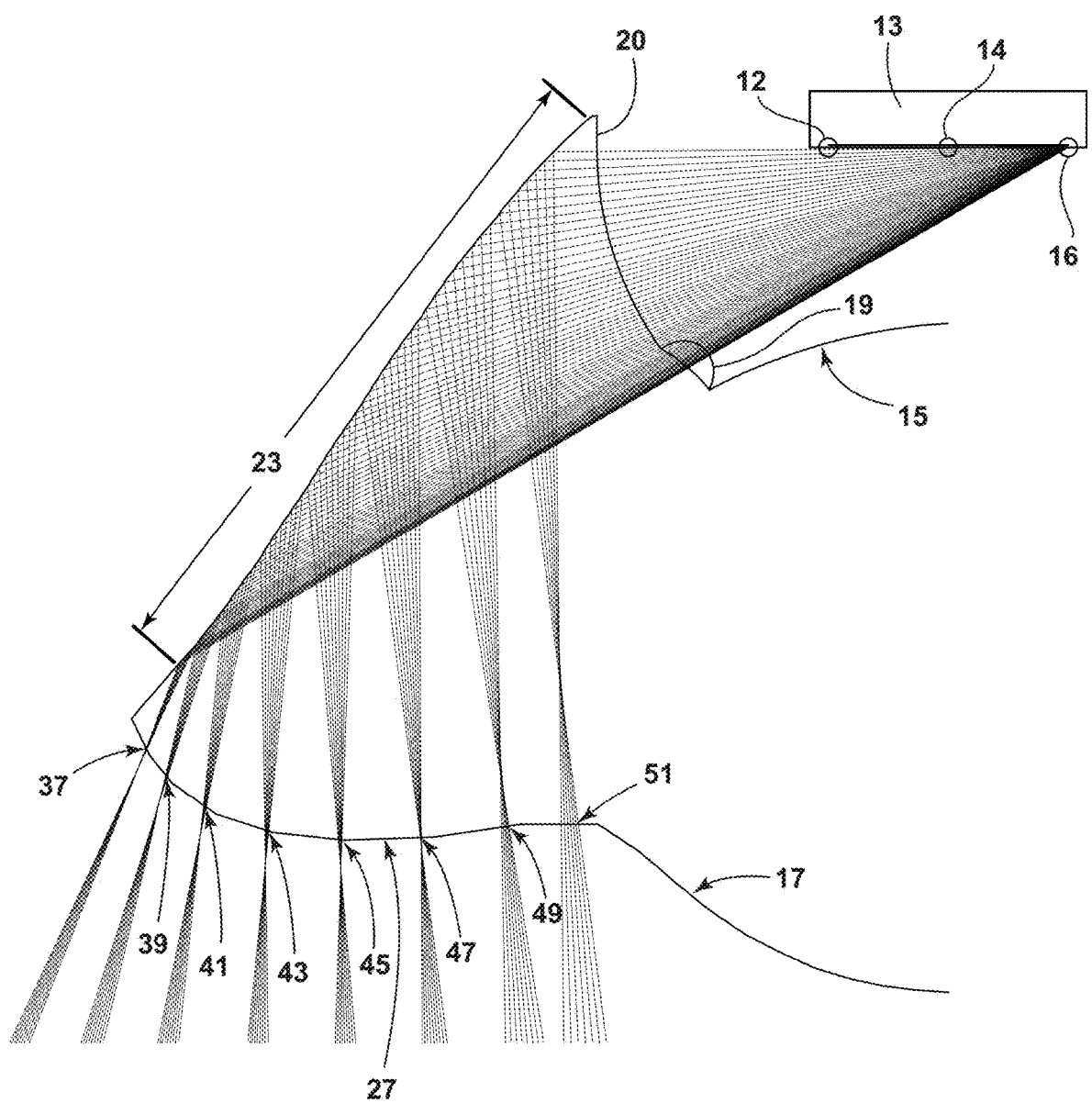
FIG. 16 is a CAD ray trace for TIR elements from an LED right light center point with refracted exit rays not shown.
Figure 17:
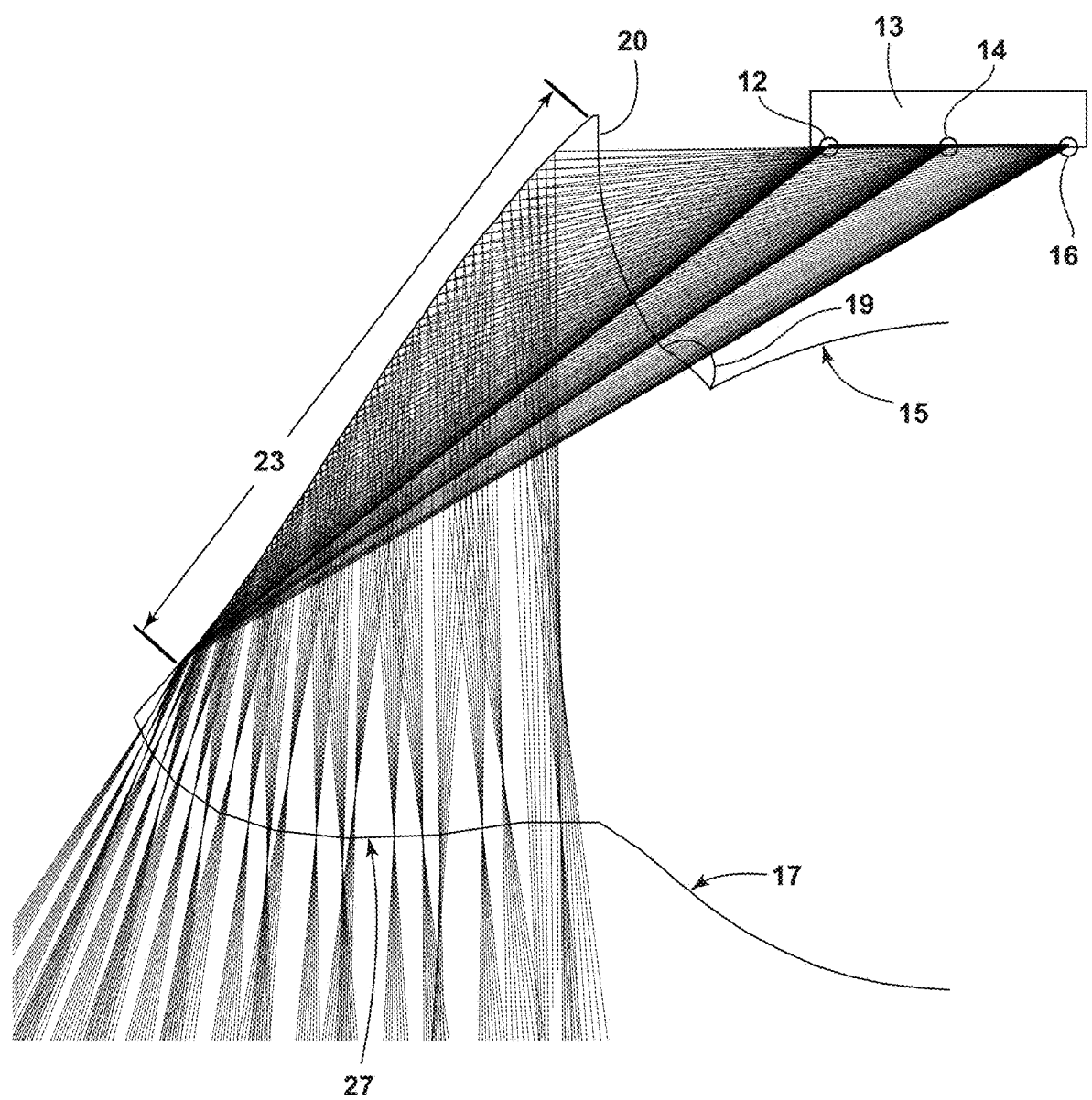
FIG. 17 is a CAD ray trace for TIR elements from an LED left, center, and right light center points with refracted exit rays not shown.

In combination with the LED design light center 14 for each TIR facet described above, the farthest left and right edges 12, 16 of the illuminated LED area are also appropriately aimed onto the same corresponding facets 37, 39, 41, 43, 45, 47, 49, 51 of the exit face lens 27 as shown in FIGS. 15 and 16. Thus, each corresponding front emitting facet 37, 39, 41, 43, 45, 47, 49, 51 of the angle matched refracting lens 27 collects the light from all three points of light 12, 14, 16 across the planar face of the LED 13, as illustrated in FIG. 17. As will be noted, the light impacting the light from the left and right edges 12, 16 impacts the respective facets, e.g. 51 on either side of the light directed from the central point of light 14.

Thus, in overall effect, in the illustrative embodiment, the amount of small spreading (diverging) of the light that occurs for each of the illustrative eight facet groups 53, 55, 57, 59, 61, 63, 65, 67 along the side of the optic 11 combined with the additional spreading due to the light emanating from the entire face 18 of the LED 13 results in an overall mixing of light from the LED 13. This spreading of the LED color variance throughout the beam reduces the color-over-angle projected into the output beam and onto an illuminated surface, for example, such as a wall surface. Thus, a notable feature of the optical design of the illustrative embodiment is a one-to-one ray trace correspondence of the light reflected from each grouping of TIR facets e.g. 53, for all three light center positions 12, 14, 16 onto each corresponding angle-matched refracting exiting surface or facet 37, 39, 41, 43, 45, 47, 49, 51 of the angle matched refracting lens 27.

In an illustrative embodiment, all of the eight refractor facets 37, 39, 41, 43, 45, 47, 49, 51 are flat line segments when viewed in cross section and are used to angle the light exiting out +/−5 degrees from nadir. These segments may be defined by circular discontinuities, as may be seen in FIG. 2. In an illustrative embodiment, each of the eight refractor facets, e.g. 37, has a width just wide enough to collect all of the central rays from the three light points 12, 14, 16. FIG. 17 shows the three ray groupings from LED points 12, 14 & 16 and illustrates in discrete fashion how the three light ray bundles from the three discrete light centers 12, 14, 16 are spread across the refractor facet 51.

The lowest and final TIR reflector section 25 uses parabolic beam reflecting elements to project light in parallel rays. In an illustrative embodiment shown in FIGS. 18 and 19, nine parabolic facets 91, 93, 95, 97, 99, 101, 103, 105, 107 are employed, as shown in FIG. 19. In the illustrative embodiment, the right light center point 16 is not collected and aimed toward the lowest parabolic beam reflecting TIR reflector section 25. As with the facets of region 23 of the optic 11, the parabolic facets, e.g. 91, are defined by a discontinuities which are circular and extend 360 degrees around the optic 11. Each such circular discontinuity is again centered about the central axis 31 of the optic 11 and lies in a plane perpendicular to that axis 31.

Figure 18:
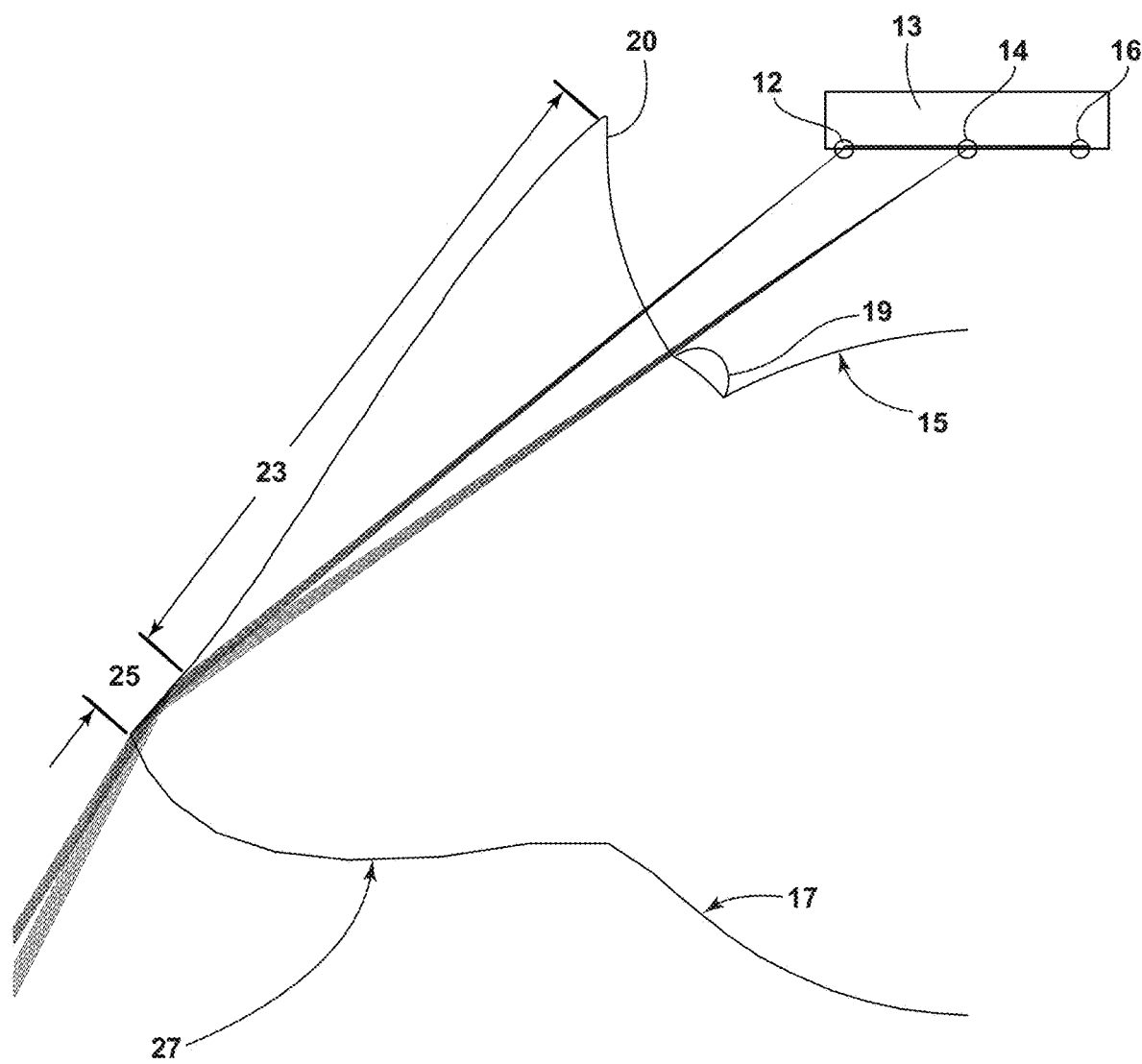
FIG. 18 is a CAD ray trace for a lowest parabolic TIR element from center and left light center points with refracted exits rays not shown.
Figure 19:
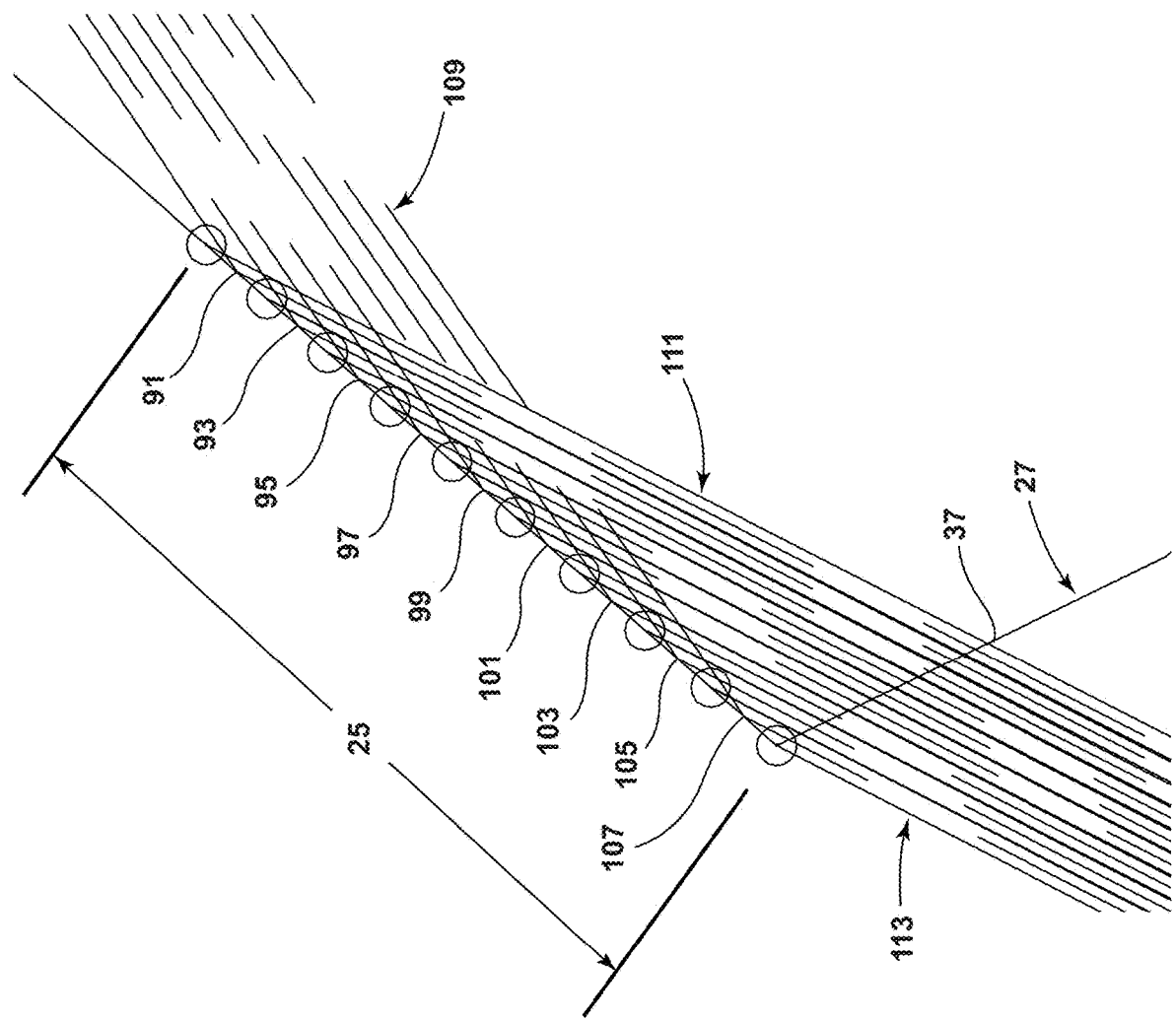
FIG. 19 is an enlarged view of a portion of FIG. 18.

As shown in FIGS. 18 and 19, in the illustrative embodiment, the parabolic reflector section directs the incident light 109 as parallel rays 111 onto the last (leftmost) shared angle-matched refracting exiting surface 37 of the angle matched refracting lens 27 from which it is refracted out into the output beam. As with the development of the central portion of the lens optic 15, 17 described above, this grouping of circumferentially disposed facets, e.g. 91, does minimal color mixing of the light from the LED 13 since the light is projected out in parallel rays 113. However, this portion 113 of the light from the LED 13 has minimal color-over-angle issues.

Figure 4:
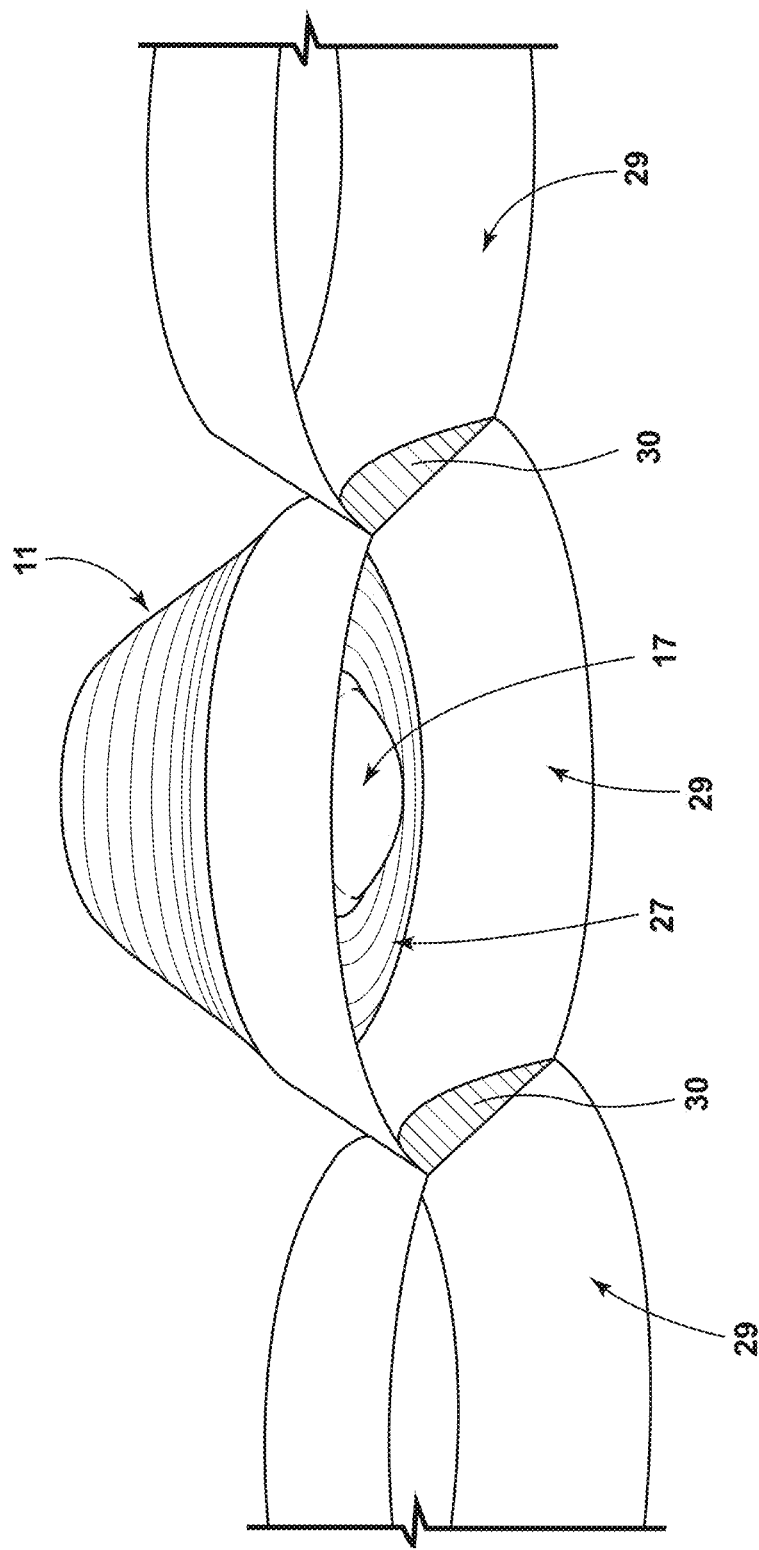
FIG. 4 is a bottom perspective view of an illustrative embodiment employing secondary reflectors and baffles.
Figure 20:
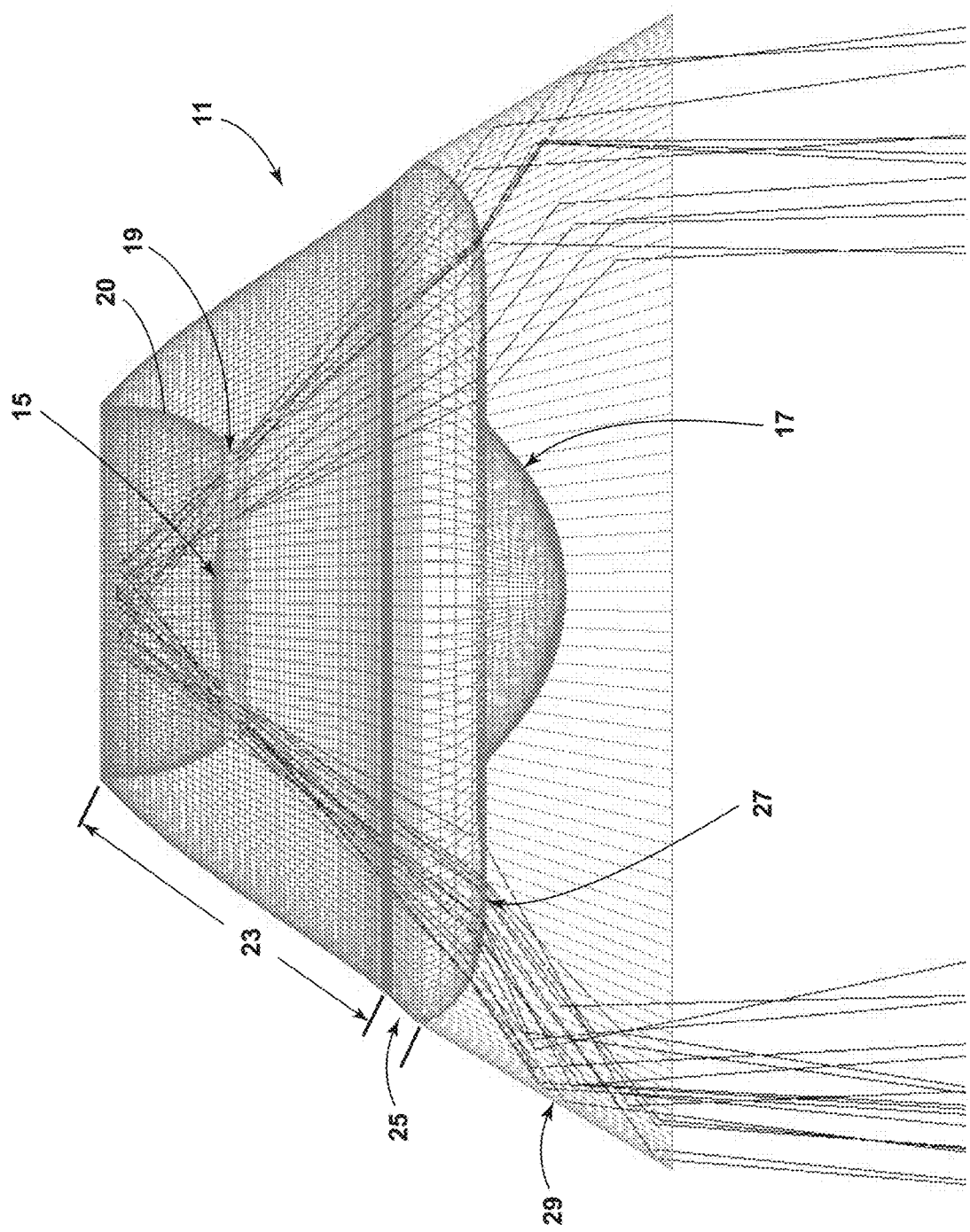
FIG. 20 is a computer ray trace simulation of a 360 degree lower collecting lens directing light to a secondary reflector from an entire LED with actual refracted rays shown.

In an illustrative embodiment, any light that is emitted away from the central axis portion of the beam from the parabolic section 25 of the lens portion 21 is collected by a secondary external reflector system 29 which, in an illustrative embodiment, comprises a cone angled at +/−30 degrees from the central axis 31 (0-180-degree vertical axis), as illustrated in FIGS. 4 and 20. According to the illustrative embodiment, the rays of light from the parabolic facet group 25 and the remaining light collected from the LED 13 by the lower collecting lens 19 are better utilized by directing this light to the numerous shared angle matched refracting exiting surfaces of the angle matched refracting lens 27 and then to the secondary external reflector system 29, which then directs the collected light outward into a more useful portion of the desired beam.

In various embodiments, the cone shaped reflector 29 can be textured or diffused in various exterior areas facing the optic 11 to concisely spread the light to the portions of the beam nearest a wall or other surface to substantially reduce color-over-angle and illuminance/luminance irregularities projected onto the surface, thus achieving an overall smoother, more uniformly lit appearance. See FIG. 21, which shows an entire computer ray trace simulation for the complete combined optical system from the entire single LED 13 with actual refracted exit rays shown.

Illustrative embodiments of an optic system for a single LED, as described above, can then be repeated and arranged in uniform spacing, along many geometric shapes (linear, circular or arbitrary 3-dimensional) as needed to produce the optimal lumen output, watts, and overall thermal operation of an entire specified lighting fixture. In addition, if needed, secondary external baffles 30, black, textured or diffused, can be used in between each individual optic system to control any unwanted side or lateral light when the optical system spacing does not allow for a full reflector cone width, as illustrated in FIG. 4.

Figure 21:
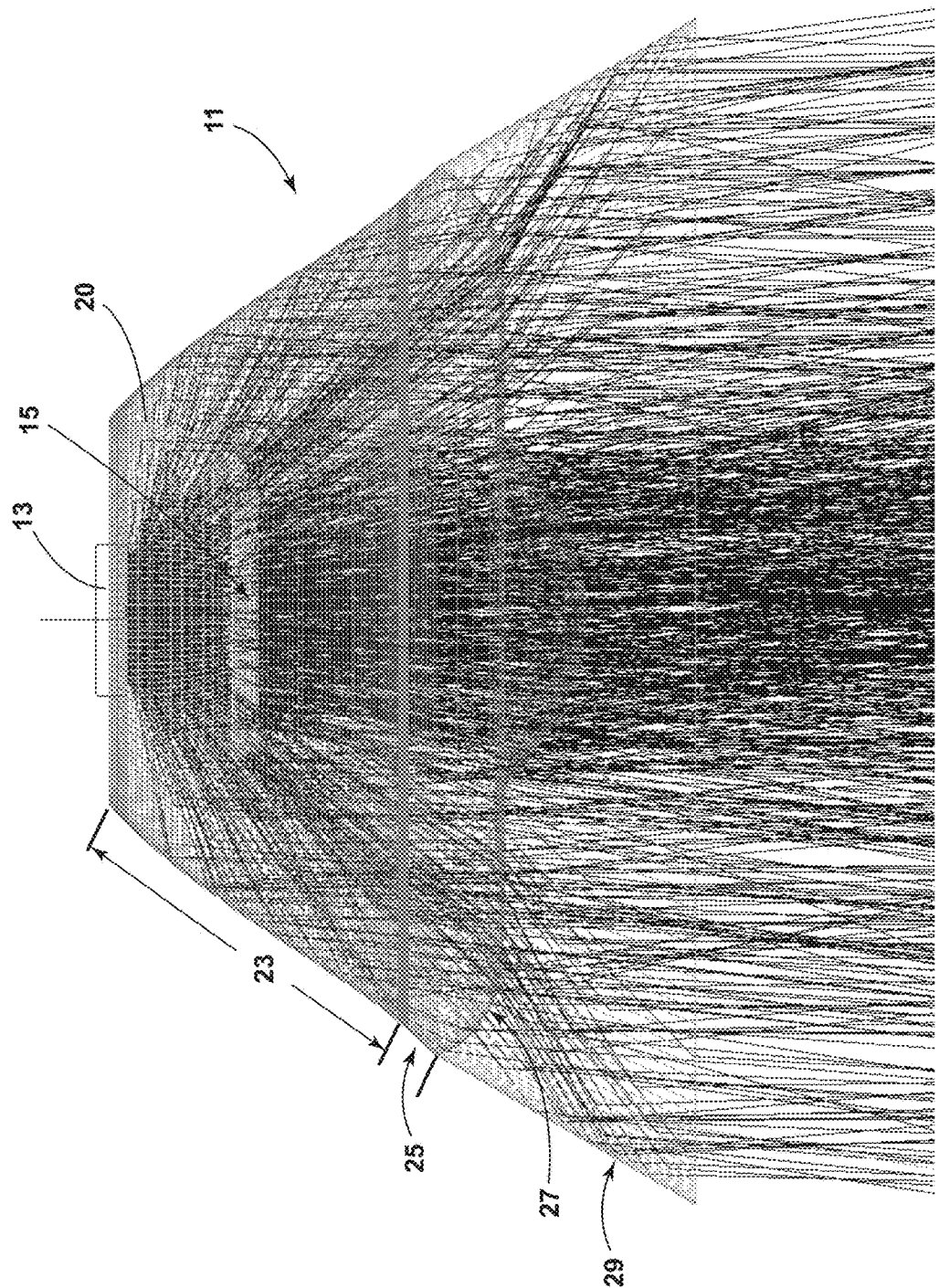
FIG. 21 is a computer ray trace simulation showing a complete combined optical system from the entire single LED with refracted exit rays shown.

As an additional design element, each grouping of facets 23, 25 can also incorporate flat rectangular facets as illustrated in FIGS. 7, 20, 21 or curved facets (concave or convex) about the axis of symmetry, 0-180-degree vertical axis, instead of smooth frusto-conical facets as shown in FIG. 2.

Figure 22:
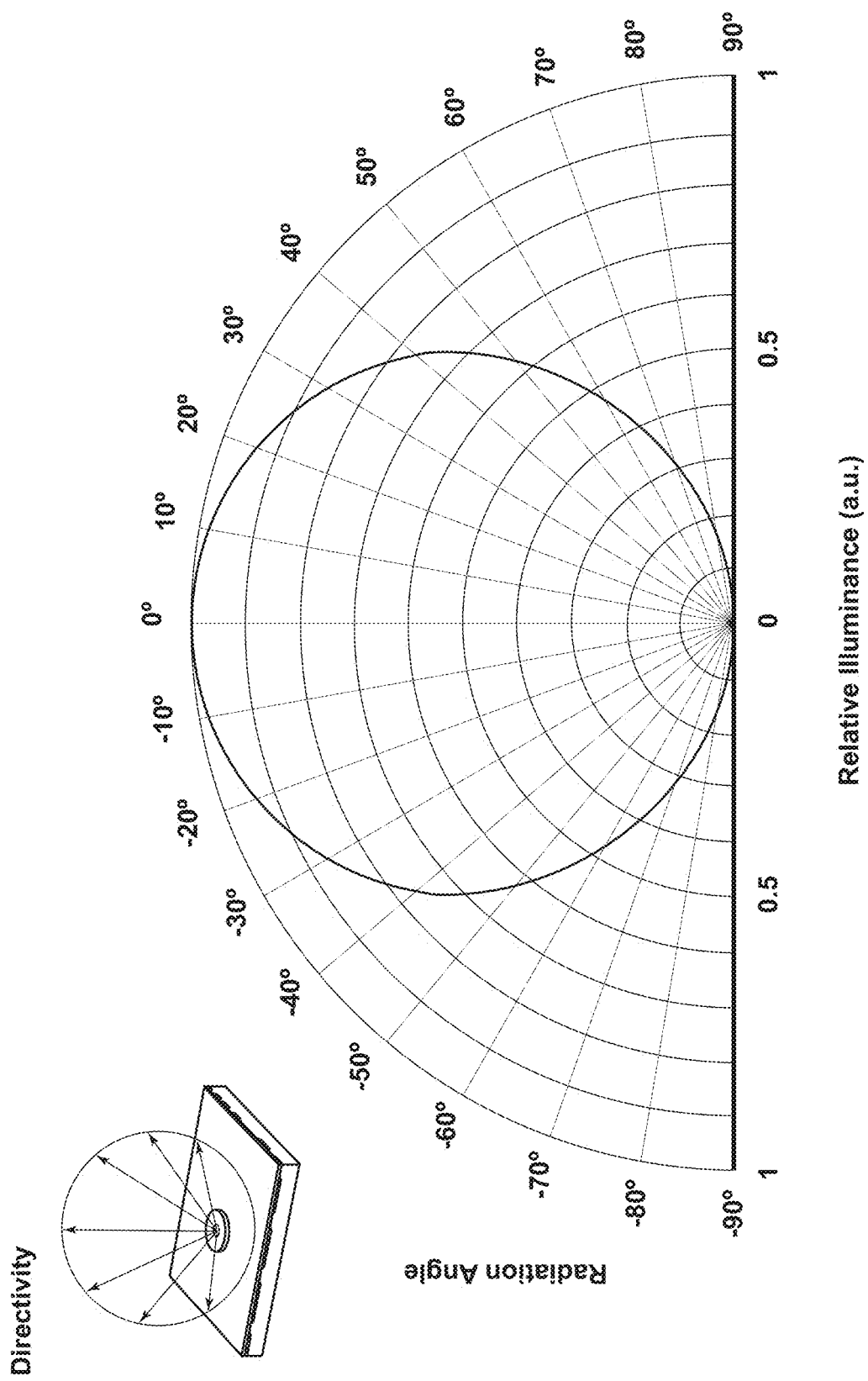
FIG. 22 shows a flat, one-sided LED emitter polar light plot.
Figure 23:
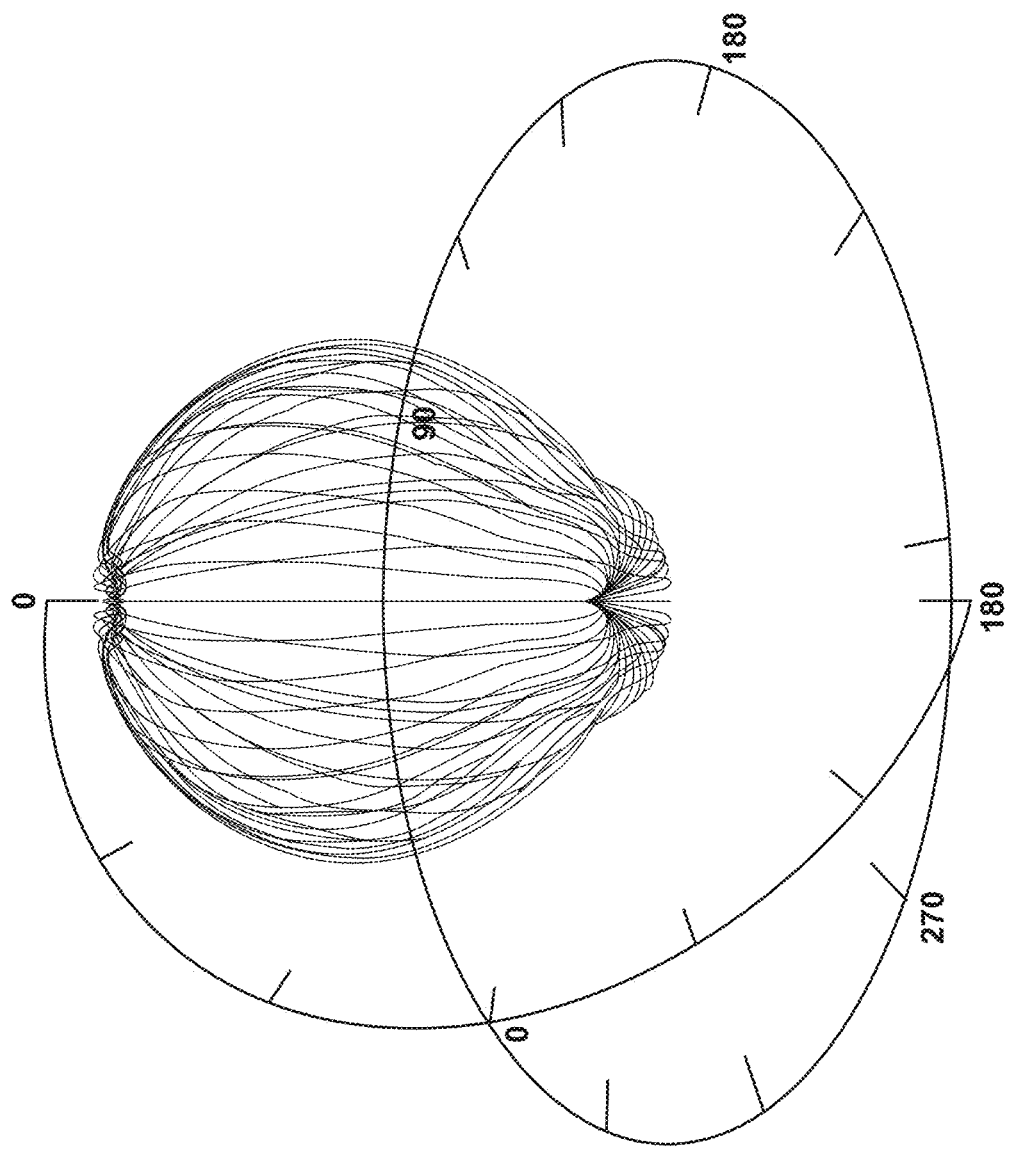
FIG. 23 is a perspective 3-D view of a five-sided LED emitter light plot.
Figure 24:
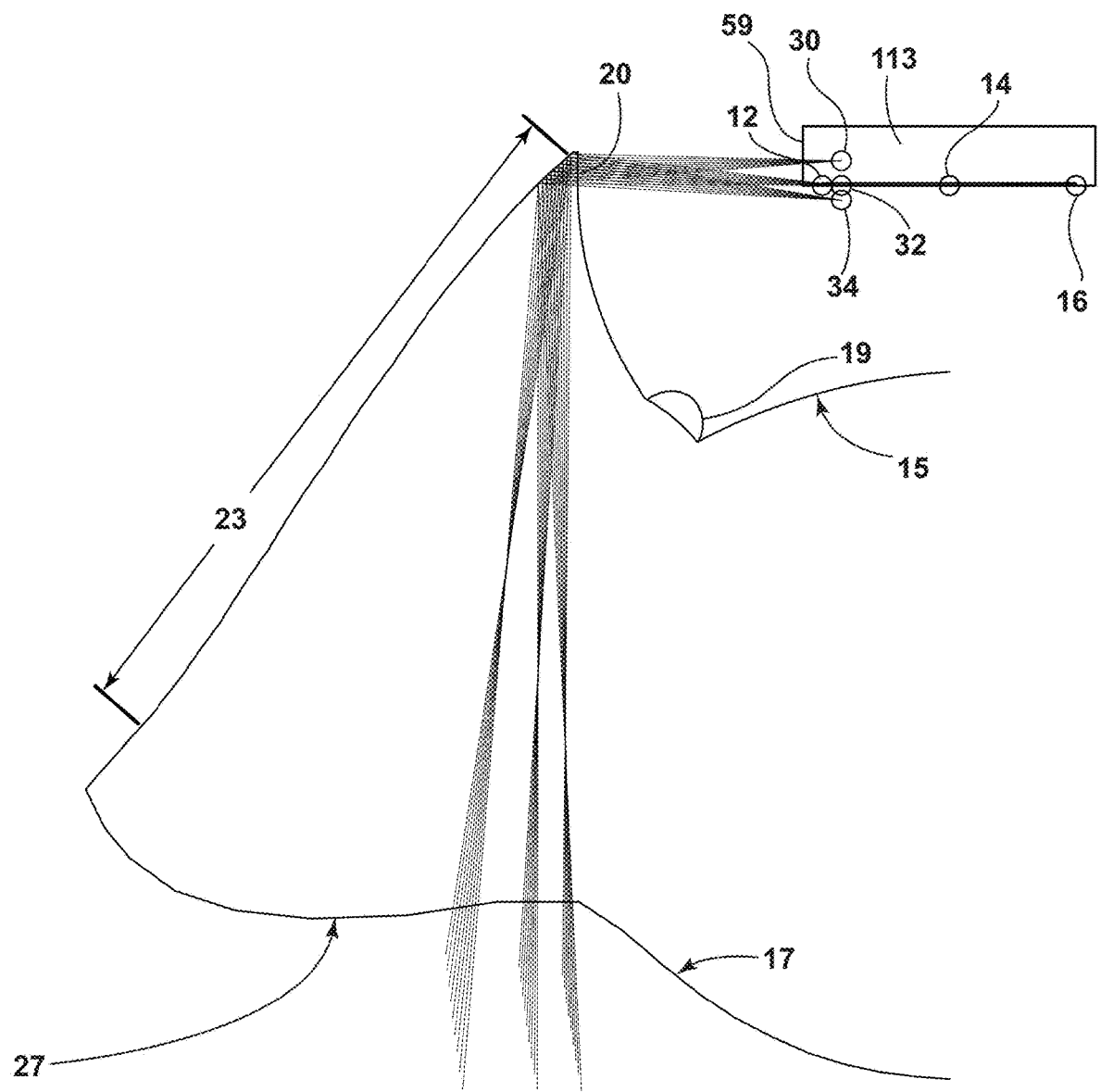
FIG. 24 is a computer ray trace simulation of a five sided LED embodiment.

The optic design disclosed in the foregoing discussion is directed to a one-sided LED, which may have a light output distribution as illustrated in FIG. 22. As shown in FIG. 24, for five-sided emitting LED's, which have an output distribution like that shown in FIG. 23, the vertical surface 59 nearest the TIR 23 can also follow the three points of light ray trace approach. Since the LED emitting source 113 is much closer to the annular TIR reflector grouping 23, it will have a larger diverging beam, and it may not be possible to collect all the light from vertical side LED surface grouping 59 for all three light center positions 30, 32, 34 and direct the light onto the first shared angle-matched refracting exiting surface of the lens 27. Again in illustrative embodiments, the design may be optimized for best results, keeping to the overall light beam design intent as described above.

Those skilled in the art will appreciate that the illustrative embodiments provide a combination of TIR reflector and secondary refractor optics to achieve narrower beam forming light patterns with color consistency and reduced "color over angle" effect. Those skilled in the art will further appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. An LED optic comprising:
   a plurality of groups of first flat TIR facets arranged down a side of the optic, wherein each flat TIR facet has a face which is a linear segment in section without peaks or depressions and comprises a frustum of a right circular cone centered on a central axis of the optic;
   each group of first flat TIR facets containing a plurality of flat TIR facets arrayed linearly adjacent one another down said side, the flat face of each flat TIR facet of a group joining an upper end and a lower end of the facet, wherein a lower end of a first flat TIR facet of a group lies adjacent the upper end of a second flat TIR facet of that group positioned beneath it, the respective adjacent ends being defined by a discontinuity which is circular and extends 360 degrees around the optic and is centered about the central axis of the optic and lies in a plane perpendicular to that axis;
   an angle matched refracting lens disposed beneath said plurality of groups of first flat TIR facets and comprising a plurality of second refractor facets separated from each other by a circular discontinuity; and
   wherein each flat TIR facet of each group of first flat TIR facets is configured to diverge light incident thereupon and wherein each group of flat TIR facets is configured to direct light onto a respective one of the second refractor facets of the angle matched refracting lens.

2. The LED optic of claim 1 further comprising a plurality of parabolic facets located on the side of the optic and below the plurality of groups of first flat TIR facets, the plurality of parabolic facets being parabolic in side section and configured to direct light onto one of the second facets of the angle matched refracting lens.

3. The LED optic of claim 1 further comprising a first lens and a second lens disposed beneath the first lens, the second lens being surrounded by the angle matched refracting lens, the first lens and second lens being configured to redirect diverging beams of light exiting from a surface of an LED and received by the first lens.

4. The LED optic of claim 2 further comprising a first lens and a second lens disposed beneath the first lens, the second lens being surrounded by the angle matched refracting lens, the first lens and second lens being configured to redirect diverging beams of light exiting from a surface of an LED and received by the first lens.

5. The LED optic of claim 3 wherein the first lens is positioned within an upper collecting optic, the upper collecting optic being configured to direct light from the LED onto the plurality of groups of first flat TIR facets.

6. The LED optic of claim 4 wherein the first lens is positioned within an upper collecting optic, the upper collecting optic being configured to direct light from the LED onto the plurality of groups of first facets.

7. The LED optic of claim 5 further comprising a lower collecting lens positioned between the upper collecting optic and the first lens and configured to project light from the LED onto the angle matched refracting lens.

8. The LED optic of claim 6 further comprising a lower collecting lens positioned between the upper collecting optic and the first lens and configured to project light from the LED onto the angle matched refracting lens.

9. The LED optic of claim 1 wherein a second facet of the angle matched refracting lens is configured to produce an output beam having a 10 degree spread.

10. The LED optic of claim 1 wherein each second facet of the angle matched refracting lens is configured to produce an output beam having a 10 degree spread.

11. The LED optic of claim 1 having an external reflector cone attached about a perimeter of a front surface of the LED optic.

12. The LED optic of claim 11 further comprising one or more external side baffles positioned to control lateral light emitted from the LED optic.

13. An LED optic comprising:
a first lens adapted to be positioned below an LED, the first lens being positioned within a lower collecting lens and an upper collecting optic and above a second lens, the first lens, the lower collecting lens and upper collecting optic being positioned at a top end of a second lens portion,
wherein the second lens portion has a first side section bearing a plurality of groups of flat TIR facets, each flat TIR facet being configured to diverge light incident thereupon;
wherein the second lens portion further has a second side section of parabolic beam-reflecting TIR facets each of which is parabolic in side section, the second side section of parabolic facets being located below the first side section bearing the plurality of groups of flat TIR facets;
a horizontally disposed angle-matched refracting lens positioned at an end of the second side section of parabolic TIR facets, the angle-matched refracting lens surrounding said second lens; and
wherein each flat TIR facet has a face which is a linear segment in section without peaks or depressions and comprises a frustum of a right circular cone formed about a central axis of the optic.

14. The LED optic of claim 13 having an external reflector cone attached about a perimeter of a front surface of the LED optic.

15. The LED optic of claim 14 further comprising one or more external side baffles positioned to control lateral light emitted from the LED optic.

16. The LED optic of claim 13 wherein the first and second lens are configured to collimate light emitted from a front surface of the LED.

17. The LED optic of claim 13 wherein the upper collecting optic is configured to direct light onto the plurality of groups of flat TIR facets.

18. The LED optic of claim 17 wherein the lower collecting lens is configured to direct light from the LED which is not collected by the upper collecting optic.

19. The LED optic of claim 13 wherein each end of each flat TIR facet is defined by a discontinuity which is circular and extends 360 degrees around the optic and is centered about a central axis of the optic and lies in a plane perpendicular to that axis.

20. The LED optic of claim 19 wherein each first flat TIR facet is frusto-conically shaped.

21. The LED optic of claim 13 wherein the second side section of parabolic beam reflecting TIR facets is configured to direct light received from the upper collecting optic as parallel rays.

22. The LED optic of claim 13 wherein each end of each parabolic facet is defined by a discontinuity which is circular and extends 360 degrees around the optic and is centered about a central axis of the optic and lies in a plane perpendicular to that axis.

23. An LED optic comprising:
an angle matched refracting lens comprising a plurality of refractor facets located along a bottom light emitting surface of the optic and defined by a plurality of circular discontinuities;
a plurality of facet groups each facet group containing a plurality of frusto-conically shaped TIR facets arranged down a side of the optic and positioned to lie beneath an LED, each facet of each group being flat so as to diverge light incident thereupon, each facet group of frusto-conically shaped flat TIR facets being configured to direct light upon a corresponding one of the plurality of facets of the angle matched refracting lens;
a first spherical convex lens positioned below the LED;
an upper collecting optic disposed above and radially surrounding the first spherical convex lens, the upper collecting optic having a surface located at a selected radius from a center point of light of the LED, the upper collecting optic being configured to direct light from the LED onto each of the groups of frusto-conically shaped TIR facets; and
wherein each flat TIR facet has a face which is a linear segment in section without peaks or depressions and comprises a frustum of a right circular cone formed about a central axis of the optic.

24. The LED optic of claim 23 wherein each group of frusto-conically shaped TIR facets contains a plurality of flat TIR facets arrayed linearly adjacent one another down said side, the face of each flat TIR facet of a group joining an upper end and a lower end of the facet, wherein a lower end of a first TIR facet of a group lies adjacent the upper end of a second TIR facet of that group positioned beneath it, the respective adjacent ends being defined by a discontinuity which is circular and extends 360 degrees around the optic and is centered about the central axis of the optic and lies in a plane perpendicular to that axis.

25. The LED optic of claim 24 further comprising a plurality of parabolic facets located on the side of the optic and below the plurality of groups of frusto-conically shaped TIR facets, the plurality of parabolic facets being parabolic in side section and configured to direct light onto one of the facets of the angle matched refracting lens.

26. The LED optic of claim 23 wherein a facet of the angle matched refracting lens is configured to produce an output beam having a 10 degree spread.

27. The LED optic of claim 23 wherein each facet of the angle matched refracting lens is configured to produce an output beam having a 10 degree spread.

28. The LED optic of claim 23 further comprising a lower collecting lens positioned between the upper collecting optic and the first spherical convex lens and configured to project light from the LED onto the angle matched refracting lens.

29. The LED optic of claim 25 further comprising a lower collecting lens positioned between the upper collecting optic and the first spherical convex lens and configured to project light from the LED onto the angle matched refracting lens.

30. The LED optic of claim 23 further comprising a second spherical convex lens disposed beneath the first spherical convex lens, the second spherical convex lens being surrounded by the angle matched refracting lens, the first spherical convex lens and second spherical convex lens being configured to redirect diverging beams of light exiting from a surface of the LED and received by the first spherical convex lens.

31. The LED optic of claim 25 further comprising a second spherical convex lens disposed beneath the first spherical convex lens, the second spherical convex lens being surrounded by the angle matched refracting lens, the first spherical convex lens and second spherical convex lens being configured to redirect diverging beams of light exiting from a surface of the LED and received by the first spherical convex lens.

32. The LED optic of claim 29 further comprising a second spherical convex lens disposed beneath the first spherical convex lens, the second spherical convex lens being surrounded by the angle matched refracting lens, the first spherical convex lens and second spherical convex lens being configured to redirect diverging beams of light exiting from a surface of the LED and received by the first spherical convex lens.

33. The LED optic of claim 23 wherein each facet of the angle matched refracting lens is configured to produce an output beam having a 10 degree spread.

34. An LED optic comprising:
an angle matched refracting lens comprising a plurality of refractor facets located along a bottom light emitting surface of the optic and defined by a plurality of circular discontinuities;

a plurality of facet groups, each comprising a plurality of frusto-conically shaped TIR facets arranged down a side of the optic and positioned to lie beneath an LED, each facet of each facet group being flat so as to diverge light incident thereupon, each facet group of a plurality of frusto-conically shaped facets being configured to direct light upon a corresponding one of the plurality of facets of the angle matched refracting lens;

a first spherical convex lens adapted to be positioned below the LED;

an upper collecting optic disposed above and radially surrounding the first spherical convex lens, the upper collecting optic having a surface located at a selected radius from a center point of light of the LED, the upper collecting optic being configured to direct light from the LED onto each of the groups of frusto-conically shaped TIR facets;

a plurality of parabolic facets located on the side of the optic and below the plurality of groups of frusto-conically shaped TIR facets, the plurality of parabolic facets being parabolic in side section and configured to direct light onto one of the facets of the angle matched refracting lens;

a lower collecting lens positioned between the upper collecting optic and the first spherical convex lens and configured to project light from the LED onto the angle matched refracting lens;

a second spherical convex lens disposed beneath the first spherical convex lens, the second spherical convex lens being surrounded by the angle matched refracting lens, the first spherical convex lens and second spherical convex lens being configured to redirect diverging beams of light exiting from a surface of an LED and received by the first spherical convex lens;

wherein each group of frusto-conically shaped TIR facets contains a plurality of flat TIR facets arrayed linearly adjacent one another down said side, each flat TIR facet of a group having a flat face joining an upper end and a lower end of the facet, wherein a lower end of a first TIR facet of a group lies adjacent the upper end of a second TIR facet of that group positioned beneath it, the respective adjacent ends being defined by a discontinuity which is circular and extends 360 degrees around the optic and is centered on a central axis of the optic and lies in a plane perpendicular to that axis; and wherein the flat face of each flat TIR facet is a linear segment in section without peaks or depressions and comprises a frustum of a right circular cone centered on the central axis of the optic.

* * * * *